United States Patent [19]
Babrowicz

[11] Patent Number: 5,837,335
[45] Date of Patent: Nov. 17, 1998

[54] HIGH SHRINK MULTILAYER FILM WHICH MAINTAINS OPTICS UPON SHRINKING

[75] Inventor: Robert Babrowicz, Spartanburg, S.C.

[73] Assignee: Cryovac, Inc., Duncan, S.C.

[21] Appl. No.: 681,642

[22] Filed: Jul. 29, 1996

Related U.S. Application Data

[63] Continuation-in-part of Ser. No. 332,990, Nov. 1, 1994, abandoned, which is a continuation-in-part of Ser. No. 317,509, Oct. 4, 1994, abandoned.

[51] Int. Cl.$^6$ .............................. B65B 53/00; F16B 4/00
[52] U.S. Cl. ................... 428/34.9; 428/35.2; 428/35.4; 428/36.6; 428/36.7; 428/516; 428/348; 428/500; 428/216; 428/518; 428/519
[58] Field of Search ................... 428/516, 348, 428/500, 216, 518, 519, 34.9, 35.2, 35.4, 36.6, 36.7

[56] References Cited

U.S. PATENT DOCUMENTS

| | | | |
|---|---|---|---|
| 3,161,629 | 12/1964 | Gorsich | 526/160 |
| 3,399,156 | 8/1968 | Bell | 524/269 |
| 4,064,296 | 12/1977 | Bornstein et al. | 428/34.9 |
| 4,120,716 | 10/1978 | Bonet | 156/272.6 |
| 4,207,363 | 6/1980 | Lustig et al. | 428/34.9 |

(List continued on next page.)

FOREIGN PATENT DOCUMENTS

| | | |
|---|---|---|
| 0 217 596 | 4/1987 | European Pat. Off. . |
| 0 416 815 | 3/1991 | European Pat. Off. . |
| 0 452 920 | 10/1991 | European Pat. Off. . |
| 0 495 099 | 7/1992 | European Pat. Off. . |
| 0 586 160 | 3/1994 | European Pat. Off. . |

(List continued on next page.)

OTHER PUBLICATIONS

RD&E Development Order Form, Film Type LDX–3204, 1990.

"Dow's Patent on Elastic Substantially Linear Olefin Polymers", The Metallocene Monitor, 1993, pp. 2–6.

"Novel Rheological Behavior Claimed for New–Tech Polyolefins", Plastics Technology, No. 1992, pp. 23 & 25.

(List continued on next page.)

*Primary Examiner*—Leszek Kiliman
*Attorney, Agent, or Firm*—Rupert B. Hurley, Jr.

[57] ABSTRACT

A heat-shrinkable, biaxially-oriented, multilayer film has a first layer comprising an ethylene/alpha-olefin copolymer having a major DSC peak of less than 105° C. The multilayer film has a free shrink, at 185° F., of at least 80 percent, and all layers of the multilayer film are shrink-compatible with respect to one another. Preferably, the multilayer film has a second layer which is an oxygen barrier layer, and preferably both of the outer film layers are grease-resistant. Furthermore, the invention includes a bag comprising the multilayer film, as well as a packaged product having a package comprising the multilayer film.

34 Claims, 11 Drawing Sheets

U.S. PATENT DOCUMENTS

| | | | |
|---|---|---|---|
| 4,278,738 | 7/1981 | Brax et al. | 428/515 |
| 4,302,565 | 11/1981 | Goeke et al. | 526/88 |
| 4,302,566 | 11/1981 | Karol et al. | 526/124.6 |
| 4,390,587 | 6/1983 | Yoshimura et al. | 428/215 |
| 4,424,243 | 1/1984 | Nishimoto et al. | 428/34.9 |
| 4,457,960 | 7/1984 | Newsome | 428/34.9 |
| 4,501,634 | 2/1985 | Yoshimura et al. | 156/244.24 |
| 4,701,432 | 10/1987 | Welborn, Jr. | 502/113 |
| 4,724,185 | 2/1988 | Shah | 428/339 |
| 4,765,857 | 8/1988 | Ferguson | 156/229 |
| 4,863,769 | 9/1989 | Lustig et al. | 428/34.9 |
| 4,879,430 | 11/1989 | Hoffman | 428/35.1 |
| 4,935,397 | 6/1990 | Chang | 502/117 |
| 4,976,898 | 12/1990 | Lustig et al. | 264/471 |
| 5,055,438 | 10/1991 | Canich | 502/117 |
| 5,057,475 | 10/1991 | Canich et al. | 502/104 |
| 5,059,481 | 10/1991 | Lustig et al. | 428/34.9 |
| 5,084,534 | 1/1992 | Welborn, Jr. et al. | 526/160 |
| 5,088,228 | 2/1992 | Waldie, Jr. | 43/43.12 |
| 5,206,075 | 4/1993 | Hodgson | 428/216 |
| 5,241,031 | 8/1993 | Mehta | 526/348.1 |
| 5,266,392 | 11/1993 | Land et al. | 442/400 |
| 5,272,016 | 12/1993 | Ralph | 428/516 |
| 5,272,236 | 12/1993 | Lai et al. | 526/348.5 |
| 5,278,272 | 1/1994 | Lai et al. | 526/348.5 |
| 5,279,872 | 1/1994 | Ralph | 428/34.9 |
| 5,283,128 | 2/1994 | Wilhoit | 428/516 |
| 5,302,402 | 4/1994 | Dudenhoeffer et al. | 426/129 |
| 5,376,394 | 12/1994 | Dudenhoeffer et al. | 426/415 |
| 5,382,470 | 1/1995 | Vicik | 428/334 |
| 5,395,471 | 3/1995 | Obijeski | 156/244.11 |
| 5,397,613 | 3/1995 | Georgelos | 428/36.7 |
| 5,397,640 | 3/1995 | Georgelos et al. | 428/349 |
| 5,403,668 | 4/1995 | Wilhoit | 428/500 |
| 5,427,807 | 6/1995 | Chum et al. | 426/393 |
| 5,562,958 | 10/1996 | Walton et al. | 428/34.9 |
| 5,677,383 | 10/1997 | Chum et al. | 525/240 |

FOREIGN PATENT DOCUMENTS

| | | |
|---|---|---|
| 0 597 502 | 5/1994 | European Pat. Off. . |
| 0 600 425 | 6/1994 | European Pat. Off. . |
| 0 707 957 | 4/1996 | European Pat. Off. . |
| 58-37907 | of 1983 | Japan . |
| 102762/83 | 6/1983 | Japan . |
| 63-175004 | of 1988 | Japan . |
| 1 209 825 | 10/1970 | United Kingdom . |
| 2 221 649 | 2/1990 | United Kingdom . |
| WO 90/03414 | 4/1990 | WIPO . |
| WO 92/14784 | 9/1992 | WIPO . |
| WO 93/03093 | 2/1993 | WIPO . |
| WO 93/08221 | 4/1993 | WIPO . |
| WO 93/12151 | 6/1993 | WIPO . |
| WO 94/07954 | 4/1994 | WIPO . |
| WO 94/09060 | 4/1994 | WIPO . |
| WO 95/08441 | 3/1995 | WIPO . |

OTHER PUBLICATIONS

"Enter a New Generation of Polyolefins", Plastic Technology, No. 1991, pp. 15–17.

"New Polyolefin Resins Emerge: Branched Linear Copolymers", Modern Plastics International, Nov. 1992, pp. 16–18.

"Exxon Cites Breakthrough in Olefins Polymerization", Modern Plastics, Jul. 1991, pp. 61 & 62.

D2732 ASTM, "Standard Test Method for Unrestrained Linear Thermal Shrinkage of Plastic Film and Sheeting", pp. 368–371, 1990.

D2457 ASTM, "Standard Test Method for Specular Gloss of Plastic Films", pp. 266–269, 1990.

"Optical Properties of Packaging Materials", L. Pike, 1993 Technomic Publishing Co., Inc. pp. 173–180.

D1003–61 ASTM, "Standard Test Method for Haze and Luminous Transmittance of Transparent Plastics", pp. 358–362, 1990.

D 1746–70 ASTM, "Standard Test Method for Transparency of Plastic Sheeting", pp. 76–78, 1990.

Duncan Customer Service Form, H.E. Butt Grocer, Produce #9W947, 1990.

"Determination of Branching Distributions in Polyethylene and Ethylene Copolymers", Wild et al., Journal of Polymer Science, vol. 20, 1982, pp. 441–455.

Polyolefins Gain Higher Performance From New Catalyst Technologies, R. Leaversuch, Modern Plastics, Oct. 1991, pp. 46–49.

"PW Technology Watch", B. Miller, Plastics World, Nov. 1991, p. 29.

HIGH SHRINK MULTILAYER FILM WHICH MAINTAINS OPTICS UPON SHRINKING

This application is a continuation-in-part of U.S. Ser. No. 08/332,990, filed Nov. 1, 1994, abandoned, which is a continuation-in-part of U.S. Ser. No. 08/317,509, filed Oct. 4, 1994, now abandoned.

FIELD OF THE INVENTION

The present invention relates to heat-shrinkable films, especially multilayer, heat-shrinkable films suitable for use in the packaging of products. The present invention is also directed to packages made from such heat-shrinkable films, as well as packaged products utilizing such films.

BACKGROUND OF THE INVENTION

The packaging of a wide variety of products in films, both transparent films as well as non-transparent films, has for some time included packaging articles in heat-shrinkable, transparent film. Heat-shrinkable film can be used to obtain a tight package by placing the product in, for example, a bag made from the heat-shrinkable film, followed by sealing the bag and thereafter passing the product, in the sealed bag, through a shrink tunnel in which the bag shrinks to form a tight package around the product.

In such packaging operations, it is frequently desirable to maintain the air or water within the shrink tunnel or water bath, respectively, at the lowest effective temperature to accomplish the a desired level of film shrinkage, in order to avoid subjecting the product to a temperature so high that there is an undesirable effect on the product Such is particularly the case in the packaging of food products, such as fresh meat products which can be scorched by higher temperatures, even upon exposure to the relatively high temperature for only a brief period of time, for example, 30 seconds. Likewise, in the packaging of cheese products, low shrink temperatures are desirable in order to prevent discoloration of the cheese within the package.

Furthermore, in the packaging of a relatively rigid product which is not distorted by forces produced by a shrinking film, it is generally desirable to provide a heat-shrinkable packaging film with as high a free-shrink as possible, in order to provide the "tightest" possible packaging over the product. In general, a tighter package provides a superior appearance, all other factors remaining the same.

In order to provide a film with a higher free shrink, it is necessary to orient the film to a greater degree. In the prior art, the highest free shrink previously obtained at, for example, 185° F., has been about 100 percent However, the vast majority of heat shrinkable films have had a free shrink, at 185° F., of less than 80 percent, generally from about 60 to 75 percent.

The prior art films having a free shrink of greater than 80 percent have exhibited problems in maintaining high optical quality upon undergoing shrinkage, especially substantial shrinkage. That is, such high free shrink films undergo a substantial "whitening" upon shrinkage, as well as a substantial reduction in gloss. Furthermore, even delamination has been found to result in the shrinkage of such high shrink films.

It is desirable to provide a package which maintains the highest level of transparency and gloss obtainable. The loss of optical properties of the prior art high shrink films is detrimental in many packaging applications.

The packaging of food products of irregular shape, for example in bags of heat-shrinkable film, allows the film in the bag "corners" (after shrinking in the shrink tunnel, the bag corners are often referred to as "dog ears"), and other excess portions of the package, to undergo "unrestrained shrink", i.e., these portions of the package which do not contact the product and are free to shrink to a very high degree. In contrast, the film of that portion of the bag in contact with the meat product undergoes "restrained shrinkage" because the product restrains the amount which the film can shrink.

The degree of whitening and the degree of loss of gloss are both directly proportional to the amount of shrinkage the film undergoes. As a result, those portions of a bag which undergo unrestrained shrinkage exhibit more whitening and less gloss, relative to other portions of the same bag which undergo restrained shrinkage. The appearance of dog ears exhibiting substantial whitening creates package characteristics consumers find to be undesirable. Furthermore, the substantial whitening and substantial loss of gloss of film which has undergone restrained shrink undermines the ability of the consumer to observe the characteristics of the food product within the package.

In addition to a loss of optical characteristics upon shrinking, loss of optical characteristics can also be caused by lack of resistance to grease, including both processing oils used on equipment, as well as fats and oils emanating from a product being packaged. In the restrained-shrink portion of the package, loss of optical quality due to lack of grease-resistance is manifested by the same type of effects exhibited upon the shrinkage of shrink-incompatible layers, i.e., whitening, loss of gloss, and even delamination.

Thus, it is desirable to provide a film having a free shrink of at least 80 percent, the film exhibiting substantially less whitening and substantially less loss of gloss. Furthermore, it would be desirable to provide a film having an outer grease-resistant layers, in order to prevent a loss of optical properties due to the presence of grease on the surfaces of the film.

SUMMARY OF THE INVENTION

The degradation of optical characteristics upon shrinkage of heat-shrinkable multilayer films having a free shrink of at least 80 percent has been discovered to be due to one or more layers of the film lacking "shrink-compatibility" with the remaining layers of the film. It has been discovered that during or shortly after shrinking, a film layer lacking shrink-compatibility with respect to the other layers of the film, causes the film to exhibit whitening and/or loss of gloss, due to: (a) delamination; (b) void production; (c) production of irregularities at layer interfaces and/or (d) production of an irregular external film surface. Any one or more of these four undesirable occurrences can substantially reduce optical characteristics of the film. Furthermore, it has been discovered that if all layers of the multilayer film are "shrink-compatible" with respect to the other film layers, there is no substantial loss of optical properties of the film from shrinkage.

The heat-shrinkable, multilayer film of the invention can be produced in a manner so that it has a free shrink of at least 80 percent while maintaining, upon shrinking, a relatively high level of optical characteristics, such as transparency, haze, and gloss. That is, a multilayer film has been discovered which exhibits a high free shrink and which, upon being subjected to heat-shrinking, exhibits a reduced level of whitening and an improved gloss, relative to comparable films of the prior art.

Films having less than 80 percent total free shrink generally do not undergo a substantial loss of optical characteristics upon shrinkage, regardless of whether the film is a "shrink-incompatible film", as described in detail below. It is believed that this result is due to the relatively low (i.e., less than 80%) total level of shrinkage placing less shear stress between the layers of the film, resulting in lack of formation of "voids" (small areas of delamination), and/or "disturbances" at the interfaces between the layers, and/or not resulting in an outer surface which is uneven, i.e., irregular, to a degree of adversely affecting the optical properties of the film.

However, in films having total free shrink greater than 80 percent, it has been discovered that the shrink-compatibility of each layer to the other layers is critical to maintaining desired optical properties, e.g., transparency, haze, gloss, and clarity. More particularly, in the packaging of products in such films, it has been found that the film according to the present invention maintains desired optical properties upon undergoing both "restrained shrinkage" as well as "unrestrained shrinkage". Restrained shrinkage is shrinkage around a product. Unrestrained shrinkage is shrinkage outside a seal around the product, i.e., shrinkage of an "excess" portion of the package. Both restrained shrinkage and unrestrained shrinkage are discussed in detail below. As a first aspect, the present invention pertains to a heat-shrinkable, biaxially-oriented, multilayer film comprising a first layer comprising an ethylene/alpha-olefin copolymer having a major DSC peak of less than 105° C. The multilayer film has a free shrink, at 185° F., of from about 80 to 180 percent. All layers of the multilayer film are shrink-compatible with respect to one another, as determined by a standard shrink-compatibility test set forth in detail hereinbelow. In addition, the film has peak load strength per unit thickness of from about 20 to 50 pounds per mil.

Preferably, the film further comprises a second layer which is a core $O_2$-barrier layer comprising polyvinylidene chloride (PVDC). Preferably, the PVDC is present in the second layer in an amount of at least 50 percent, i.e., from 50 to 100 percent, based on the weight of the second layer; more preferably, from 50 to 99 percent; still more preferably, from about 75 to 98 percent; yet still more preferably, from about 90 to 98 percent; and even more preferably, about 96 weight percent.

Preferably, the first layer of the multilayer film comprises ethylene/alpha-olefin copolymer in an amount of from about 50 to 100 weight percent, based on the weight of the first layer; and preferably, the ethylene/alpha-olefin copolymer comprises homogeneous ethylene/alpha-olefin copolymer in an amount of from about 50 to 100 weight percent, based on the weight of ethylene/alpha-olefin copolymer, the homogeneous ethylene/alpha-olefin copolymer having a major DSC peak of less than 105° C.

Preferably, the first layer is an outer layer, and the multilayer film further comprises a third layer, the third layer being an outer layer, the third layer comprising at least one member selected from the group consisting of ionomer, homogeneous ethylene/alpha-olefin copolymer, ethylene/acrylic acid copolymer, ethylene/methyl acrylic acid copolymer, ethylene/vinyl acetate copolymer, and propylene/ethylene copolymer having an ethylene content of at least 10 percent.

Preferably, the multilayer film further comprises a fourth layer, the fourth layer being a tie layer, the fourth layer being between the first layer and the second layer, the fourth layer comprising at least one member selected from the group consisting of ethylene/vinyl acetate copolymer, ethylene/methacrylic acid copolymer, ethylene/ethyl acrylate copolymer, low density polyethylene, and linear low density polyethylene. Preferably, the multilayer film further comprises a fifth layer, the fifth layer being a tie layer, the fifth layer being between the second layer and the third layer, the fifth layer comprising at least one member selected from the group consisting of ethylene/vinyl acetate copolymer, ethylene/methacrylic acid copolymer, ethylene/ethyl acrylate copolymer, low density polyethylene, and linear low density polyethylene.

Preferably, the multilayer film further comprises at least one outer layer which is a grease-resistant layer; more preferably, both outer layers are grease-resistant layers.

As a second aspect, the invention pertains to a package comprising the heat-shrinkable, biaxially-oriented, multilayer film of the present invention.

As a third aspect, the present invention pertains to a packaged product comprising a package comprising the heat-shrinkable, biaxially-oriented, multilayer film of the present invention.

DETAILED DESCRIPTION OF THE INVENTION

Figure 1:
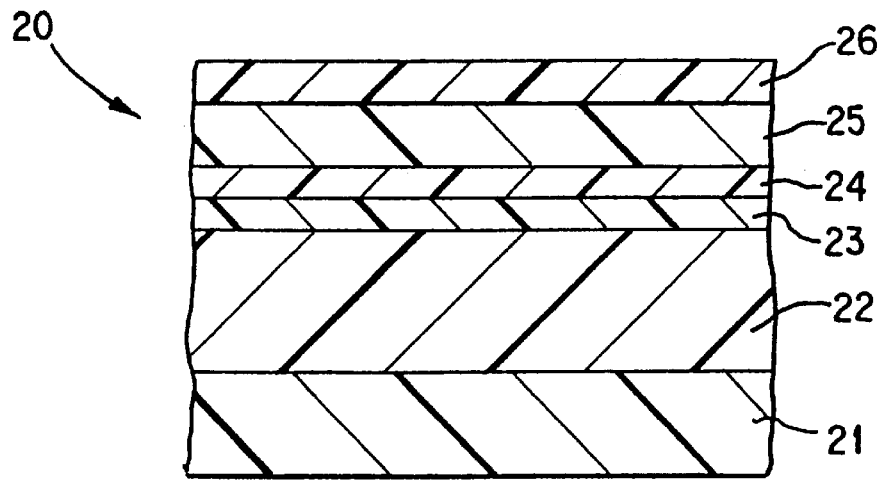
FIG. 1 illustrates a schematic cross-sectional view of a multilayer Film Nos. 1, 2, and 3, described below.

As used herein, the phrase "a first layer" refers to the fact that at least one layer of the multilayer film comprises ethylene/alpha-olefin copolymer having a major DSC peak of less than 105° C. The phrase "a first layer" is not intended to indicate any specific location of the first layer relative to the other layers of the film, or any manner in which the film can be built up. Rather, this phrase is included merely to provide a convenient method of identifying layers which differ in chemical composition.

As used herein, the phrase "free shrink" refers to the percent dimensional change in a 10 cm×10 cm specimen of film, when shrunk at 185° F., with the quantitative determination being carried out according to ASTM D 2732, as set forth in the 1990 *Annual Book of ASTM Standards*, Vol. 08.02, pp. 368–371, which is hereby incorporated, in its entirety, by reference thereto.

The multilayer film according to the present invention has a "total free shrink" of at least 80 percent "Total free shrink" is determined by summing the percent free shrink in the machine direction with the percentage of free shrink in the transverse direction. For example, a film which exhibits 50% free shrink in the transverse direction and 60% free shrink in the machine direction, has a "total free shrink" of 110%. Unless specified otherwise, the phrase "free shrink", as used herein, refers to total free shrink. Preferably, the multilayer film of the present invention has a free shrink of from 80 to 180 percent; more preferably, 80 to 160 percent; still more preferably, from about 85 to 130 percent; yet still more preferably, 90 to 120 percent; and even yet still more preferably 100 to 110 percent As used herein, the phrase "shrink-compatible" is applied only with respect to multilayer films which have a free shrink, at 185° F., of at least 80%, the phrase referring to those layers of such multilayer films which are compatible enough with one another that upon subjecting the multilayer film to a standardized test of restrained shrink, the multilayer exhibits a haze level of from 0 to 40; preferably, from 0 to 30 percent; more preferably, from 0 to 25 percent; still more preferably, from 0 to 20 percent; and, yet still more preferably, from 0 to 15 percent. Included as shrink compatible layers are: (a) a layer comprising polymer having a major DSC peak below 105° C.; (b) a layer so thin that upon conducting a standardized restrained shrinkage, the thin layer "zig-zags" in a manner that does not result in a haze level of at least 40 percent; and, (c) a layer comprising polymer having a melt point less than 80° C.

If just one of the layers of the multilayer film comprises a polymer having a major DSC peak of at least 105° C., or does not have a major DSC peak within 5° C. of the remaining film layers (with the exceptions of thin layers which zig-zag and layers comprising polymer having a melt point less than 80° C.), all the layers of the multilayer film are not shrink-compatible with respect to one another.

It has been discovered that shrink-compatibility can be achieved by ensuring that all the layers of a multilayer film have a melting point (or a major DSC peak) of less than 105° C. and within a 5° C. range, with the exception of: (a) a thin layer which "zig-zags" upon restrained shrinkage, and, (b) other layers comprising polymers having a major melt peak below 80° C. Preferably, all the layers of the multilayer film have a melting point within a 4° C. range; still more preferably, within a 3° C. range; and yet still more preferably, within a 2° C. range. Such multilayer films contain layers which tend to shrink concurrently and to the same degree, so that delamination, disturbances, voids, rough surfaces, etc., are not formed.

Preferably, the multilayer film comprises shrink-compatible layers comprising at least one polymer having a major DSC peak less than 105° C.; more preferably, the polymer having a major DSC peak less than 105° C. comprises at least one member selected from the group consisting of ethylene/alpha-olefin copolymer, ethylene/vinyl acetate copolymer, ionomer, and ethylene/acrylic acid copolymer; still more preferably, homogeneous ethylene/alpha-olefin copolymer and ethylene/vinyl acetate copolymer having a vinyl acetate content of at least 15 weight percent.

Preferably, polymer having a major DSC peak less than 105° C. makes up at least 50 weight percent of the shrink-compatible layer; more preferably, such polymer makes up at least 70 percent of the shrink-compatible layer; and still more preferably, such polymer makes up at least about 90 percent of the shrink compatible layer.

Regarding the "exceptions" referred to above, a film layer can be shrink-compatible even though it contains a layer which does not comprise a polymer having a major DSC peak of less than 105° C., provided the layer is either: (a) an inner layer thin enough that neither disturbances, delamination, nor voids are formed upon the restrained shrinkage in the shrink-compatibility test; or (b) comprises a polymer having a major melt peak below 80° C.

A core layer composed of substantially 100% polyvinylidene chloride is shrink-compatible provided it has a thickness, before shrinkage in the shrink-compatibility test, of 0.35 mil or less. However, in order to provide the multilayer film with the desired oxygen barrier characteristics while maintaining the shrink-compatibility of all the film layers with respect to one another, preferably the polyvinylidene chloride has a thickness of from about 0.15 to 0.35 mil; more preferably, about 0.2 mil. It has been found that such a thin polyvinylidene chloride core layer is forced to effectively "shrink" by the shrinkage of the remainder of the film layers on both sides of the polyvinylidene chloride core layer. However, in "shrinking", the thin polyvinylidene chloride core layer can, at least in some instances, be compressed into a "zig-zag" configuration, while having no substantial adverse effect upon the optical properties of the film. Shrink-compatibility of the thin polyvinylidene chloride layer can also be dependent upon having a tie layer of adequate thickness adjacent each side of the polyvinylidene chloride layer, these tie layers conforming to the zig-zag configuration of the polyvinylidene chloride layer, to prevent the film from hazing up.

Certain ethylene/vinyl acetate copolymers which are frequently used as tie layers, and which have a major melt peak less than 80° C., have been found to have no adverse effect upon shrink-compatibility even though they have a melting point more than 5° C. different from other polymers in the film. It has been found to be important that all layers of the film (except the thin layers as described above and layers comprising polymer having a major melt peak below 80° C.) have melting points relatively close to one another, i.e., within a range of 5° C., in order to permit the relatively high degree of orientation needed to obtain the multilayer film of the present invention, i.e., a multilayer film which exhibits shrink-compatibility and has a free shrink of at least 80 percent.

Furthermore, even if every layer of the multilayer film comprises polymer having a major DSC peak less than 105° C., the film may still comprise layers which are not shrink compatible with respect to one another. It has been found that shrink-compatibility is enhanced if the polymers having a major DSC peak less than 105° C. all have their respective major DSC peaks (i.e., respective melting points) within a span of from 0° to 5° C.; more preferably from 0° to 4° C.; still more preferably from 0° to 3° C.; yet still more preferably, from 0° to 2° C.

Preferably, shrink-compatible layers comprise ethylene/alpha-olefin copolymer having a major melt peak below 105° C., in an amount of from about 50 to 100 weight percent, based on the weight of the layer; more preferably, from about 70–100 weight percent; still more preferably, from about 85–100 weight percent; yet still more preferably, from about 90–100 weight percent. It has been found that multilayer films comprising such polymers in such amounts can be used to produce films having a free shrink of at least 80 percent while maintaining a relatively high level of optical characteristics, such as transparency, haze, and gloss.

Preferably, each of the layers in the multilayer film according to the present invention, with the exception of core layer(s) comprising polyvinylidene chloride, comprise ethylene/alpha-olefin copolymer having a major DSC melt peak below 92° C.

Figure 17:
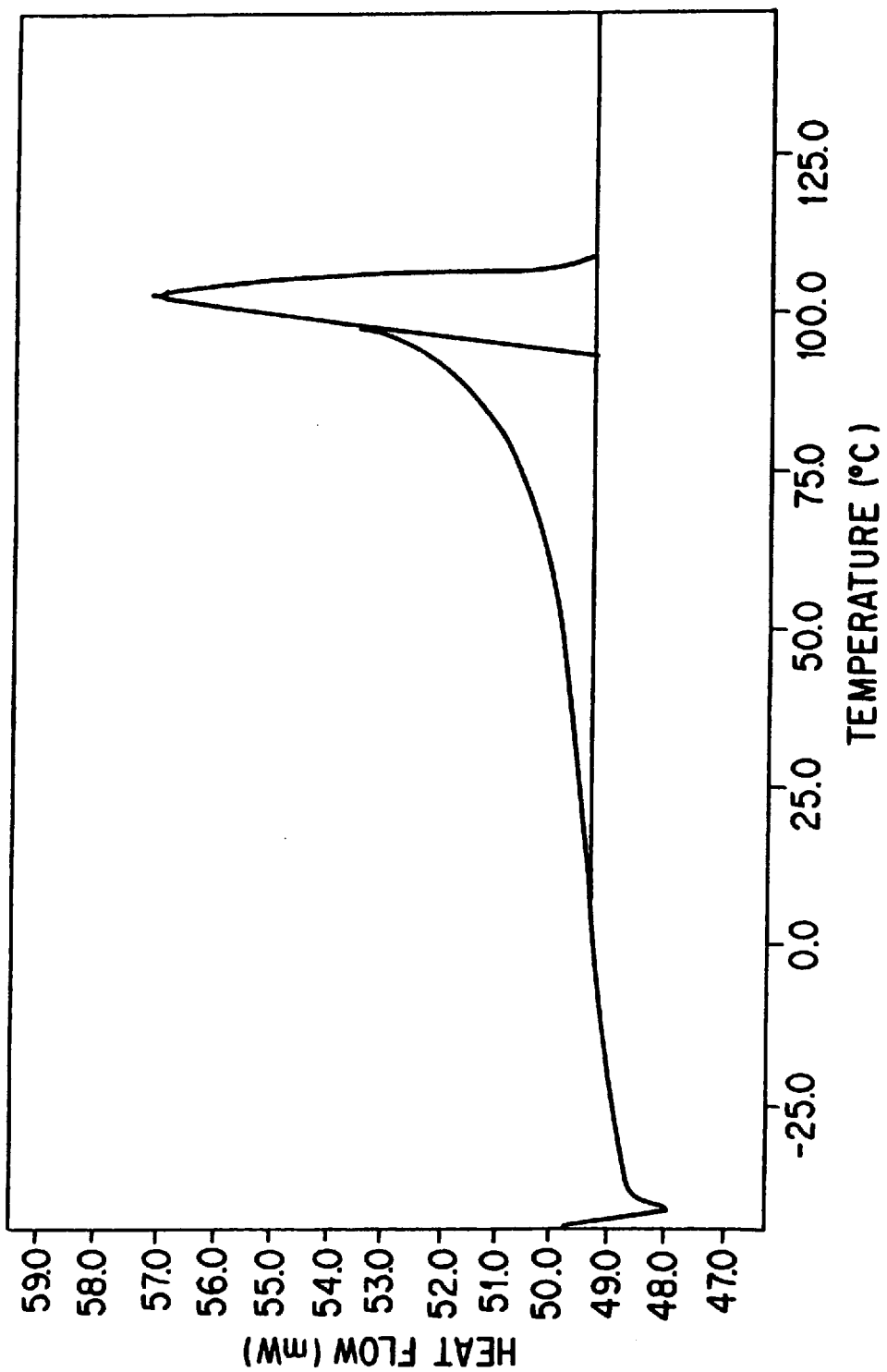
FIG. 17 is a differential scanning calorimeter (DSC) curve of a polymer having a major DSC peak less than 105° C.

FIG. 17 is a differential scanning calorimeter (DSC) plot of heat flow vs. temperature, taken at 10.0° C. per minute, for a long chain branched homogeneous ethylene/alpha-olefin copolymer, a resin obtained from The Dow Chemical Company, of Midland, Mich. As can be seen in FIG. 17, this homogeneous ethylene/alpha-olefin copolymer has a major DSC peak at about 103.1° C., indicating that this homogeneous ethylene/alpha-olefin copolymer does not contain any substantial amount of polyethylene homopolymer.

Figure 18:
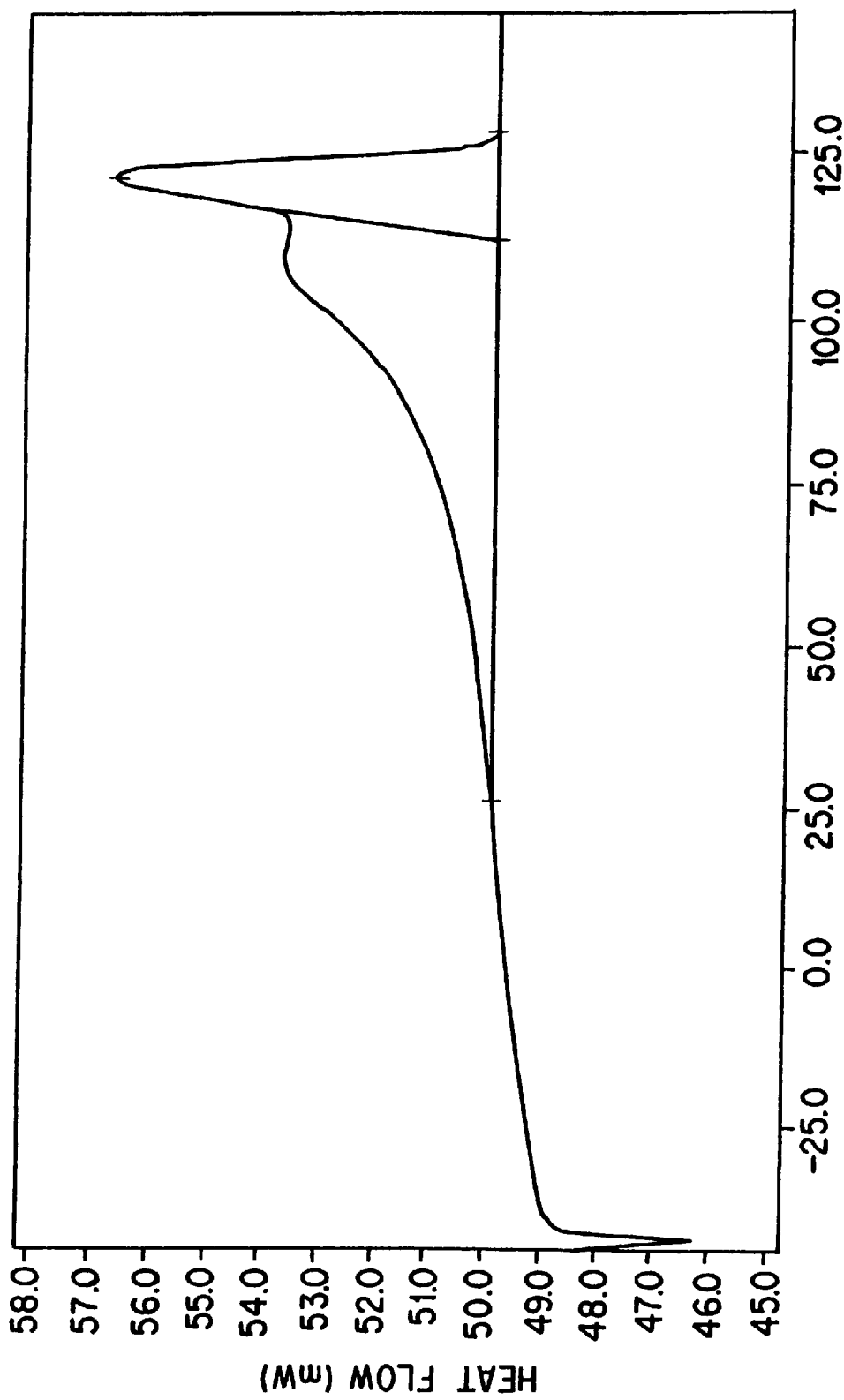
FIG. 18 is a differential scanning calorimeter (DSC) curve of a polymer having a major DSC peak greater than 105° C.

FIG. 18 is a differential scanning calorimeter (DSC) plot of heat flow vs. temperature, taken at 10.0° C. per minute, for DOWLEX 2045.03 (TM) linear low density polyethylene ("LLDPE"), also obtained from The Dow Chemical Company, of Midland, Mich. As can be seen in Figure 1B, DOWLEX 2045.03 (TM) LLDPE has a major DSC peak at 123.5° C., indicating that this LLDPE contains a fraction of high polyethylene homopolymer, in stark contrast to homogeneous ethylene/alpha-olefin copolymers.

The Standard Shrink-compatibility Test

Figure 19:
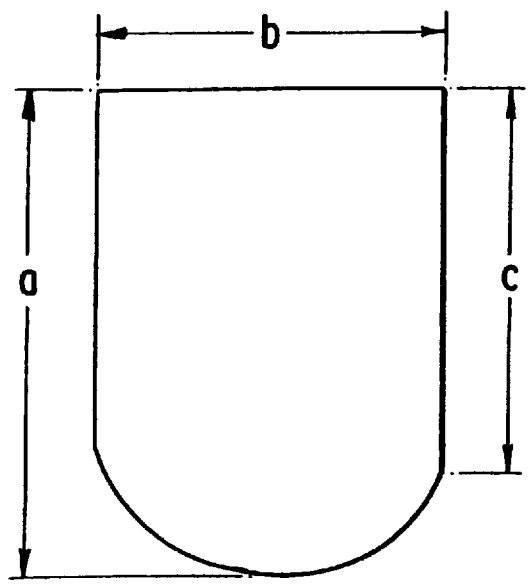
FIG. 19 is a face view of a block of wood used in a standardized shrink-compatibility test as described hereinbelow.

The standard test for shrink-compatibility, which can be used to determine whether all layers of a multilayer film are shrink-compatible with respect to one another, is carried out by first forming a rectangular bag (either end-seal or side-seal, depending upon whether a film tube of the appropriate size is available) having a length of 15 inches (between bottom seal and open top, or bottom edge and open top) and a width of 7 inches (between side edges or side seals). A block of wood (pine) having a thickness of 1.6 inches and a shape as illustrated in FIG. 19, had the following dimensions: "a" is 6.2 inches; "b" is 4.5 inches; "c" is 5.0 inches; and, the block thickness (not illustrated) is 1.6 inches. The block is then placed into the bag, with the curved block end being at the bottom of the bag.

The bag is formed from a film having a standardized thickness of about 2 mils, and the standard film must have a free shrink, at 185° F., of at least 80 percent The temperature at which the film exhibits a free shrink of 100% should be determined. The bag, having the block therein, is placed in water at 185° F., or the temperature at which the bag film exhibits a free shrink of 100%, whichever is higher. The bag, having the block therein, is held immersed in the water for a period of 10 seconds. Thereafter, the shrunken bag, having the block therein, is removed from the hot water, and an optics analysis is performed to determine the percent haze exhibited by that portion of the bag film covering either of the "main faces" of the block.

The percent haze is determined by subjecting the film to analysis by ASTM D 1003. This method is described in detail in 1990 *Annual Book of ASTM Standards*, Section 8, Vol. 08.01, ASTM D 1003, "Standard Test Method for Haze and Luminous Transmittance of Transparent Plastics", pp. 358–363, which is hereby incorporated by reference thereto, in its entirety. The haze results disclosed hereinbelow were obtained using an XL 211 HAZEGARD (TM) SYSTEM, obtained from the Gardner/Neotec Instrument Division, of Silver Spring, Md. This instrument requires a minimum sample size of about 1 square inch.

Haze is a measurement of the transmitted light scattered more than 2.5° from the axis of the incident light. It is measured with a meter similar to a total light transmission meter, with the exception that it contains a light trap to absorb light scattered less than 2.50° and regular transmitted light. It is common to measure the total transmitted light first by defeating the light trap and then setting the meter to 100. Then the light trap is allowed to absorb the light scattered less than 2.5° (plus regular transmitted light), and haze is read as a percentage of total transmitted light. Note that the denominator here is total transmitted light $(I_s+I_r)$, not incident light $(I_t)$, as in the measurement of total transmitted light.

The measurement of optical properties of plastic films used in packaging, including the measurement of total transmission, haze, clarity (i.e., total transmission) and gloss, is discussed in detail in Pike, LeRoy, "Optical Properties of Packaging Materials", *Journal of Plastic film & sheeting*, Vol. 9, No. 3, pp. 173–180 (July 1993), which is hereby incorporated by reference thereto, in its entirety.

The film which remains over the block is subjected to "restrained shrink" in that this portion of the bag film is not permitted to shrink as much as it otherwise would without the presence of the block within the bag. However, the "excess" film, which is not in contact with the block, is subjected to "unrestrained shrink", in that it undergoes shrinkage which is not "restrained" by the presence of the block.

If the percent haze of a sample of the film taken from the center of either of the main faces of the block is greater than 40%, at least one of layers of the multilayer film is deemed to lack "shrink-compatibility". Preferably, the multilayer film has a haze level, determined by the standard shrink-compatibility test, of from about 0 to 35 percent; more preferably, from about 0 to 30 percent; and still more preferably, from about 0 to 25 percent.

As used herein, the term "film" is used in a generic sense to include plastic web, regardless of whether it is film or sheet. Preferably, films of and used in the present invention have a thickness of 0.25 mm or less. As used herein, the term "package" refers to packaging materials used in the packaging of a product.

As used herein, the phrases "seal layer", "sealing layer", "heat seal layer", and "sealant layer", refer to an outer film layer, or layers, involved in the sealing of the film to itself, another film layer of the same or another film, and/or another article which is not a film. It should also be recognized that in general, up to the outer 3 mils of a film can be involved in the sealing of the film to itself or another layer. With respect to packages having only fin-type seals, as opposed to lap-type seals, the phrase "sealant layer" generally refers to the inside film layer of a package, as well as supporting layers within 3 mils of the inside surface of the sealant layer, the inside layer frequently also serving as a food contact layer in the packaging of foods.

In general, sealant layers employed in the packaging art have included the genus of thermoplastic polymers, including thermoplastic polyolefin, thermoplastic polyamide, thermoplastic polyester, and thermoplastic polyvinyl chloride. However, in the film of the present invention the sealant layers can, in general, be any thermoplastic polymer having a major DSC peak of less than 105° C., or an ethylene/vinyl acetate copolymer having a melt point below 80° C.

As used herein, the term "seal" refers to any seal of a first region of a film surface to a second region of a film surface, wherein the seal is formed by heating the regions to at least their respective seal initiation temperatures. The heating can be performed by any one or more of a wide variety of manners, such as using a heated bar, hot air, infrared radiation, ultrasonic sealing, etc.

As used herein, the term "barrier", and the phrase "barrier layer", as applied to films and/or film layers, is used with reference to the ability of a film or film layer to serve as a barrier to one or more gases. In the packaging art, oxygen (i.e., gaseous $O_2$) barrier layers have, in general, included, for example, ethylene/vinyl alcohol copolymer, polyvinyl chloride, polyvinylidene chloride, polyamide, polyester, polyacrylonitrile, etc., as known to those of skill in the art. However, in the present invention the barrier layer preferably comprises polyvinylidene chloride, together with a thermal stabilizer (i.e., HCl scavenger, e.g., epoxidized soybean oil) and a lubricating processing aid, which, for example, comprises one or more acrylates.

As used herein, the phrase "abuse layer", as well as the phrase "puncture-resistant layer", refer to an outer film layer and/or an inner film layer, so long as the film layer serves to resist abrasion, puncture, and other potential causes of reduction of package integrity, as well as potential causes of reduction of package appearance quality.

As used herein, the term "core", and the phrase "core layer", as applied to multilayer films, refer to any internal film layer which has a primary function other than serving as an adhesive or compatibilizer for adhering two layers to one another. Usually, the core layer or layers provide the multilayer film with a desired level of strength, i.e., modulus, and/or optics, and/or added abuse resistance, and/or specific impermeability.

As used herein, the phrase "skin layer" refers to an outside layer of a multilayer film in packaging a product, this skin layer being subject to abuse.

As used herein, the phrase "tie layer" refers to any internal layer having the primary purpose of adhering two layers to one another. Tie layers can comprise any polymer having a polar group grafted thereon, so that the polymer is capable of covalent bonding to polar polymers such as polyamide and ethylene/vinyl alcohol copolymer.

As used herein, the phrase "bulk layer" refers to any layer of a film which is present for the purpose of increasing the abuse-resistance, toughness, modulus, etc., of a multilayer film. Bulk layers generally comprise polymers which are inexpensive relative to other polymers in the film which provide some specific purpose unrelated to abuse-resistance, modulus, etc.

As used herein, the phrases "food-contact layer" and "meat-contact layer", refer to a layer of a multilayer film which is in direct contact with the food/meat in the package comprising the film. The food-contact/meat-contact layer is an outer layer of the multilayer film, in the sense that the food-contact/meat-contact layer is in direct contact with the meat product within the package. The food-contact/meat-contact layer is an inside layer in the sense that with respect to the packaged food product/meat product, the food-contact/meat-contact layer is the inside layer (i.e., innermost layer) of the package, this inside layer being in direct contact with the food/meat.

As used herein, the phrase "food-contact surface" and "meat-contact surface" refers to an outer surface of a food-contact layer/meat-contact layer, this outer surface being in direct contact with the food/ meat within the package.

As used herein, "EVOH" refers to ethylene/vinyl alcohol copolymer. EVOH includes saponified or hydrolyzed ethylene/vinyl acetate copolymers, and refers to a vinyl alcohol copolymer having an ethylene comonomer, and prepared by, for example, hydrolysis of vinyl acetate copolymers, or by chemical reactions with polyvinyl alcohol. The degree of hydrolysis is preferably at least 50% and more preferably at least 85%.

As used herein, the term "lamination", the term "laminate", and the phrase "laminated film", refer to the process, and resulting product, made by bonding together two or more layers of film or other materials. Lamination can be accomplished by joining layers with adhesives, joining with heat and pressure, and even spread coating and extrusion coating. The term laminate is also inclusive of coextruded multilayer films comprising one or more tie layers.

As used herein, the term "oriented" refers to a polymer-containing material which has been stretched at an elevated temperature (the orientation temperature), followed by being "set" in the stretched configuration by cooling the material while substantially retaining the stretched dimensions. Upon subsequently heating unrestrained, unannealed, oriented polymer-containing material to its orientation temperature, heat shrinkage is produced almost to the original unstretched, i.e., pre-oriented dimensions. More particularly, the term "oriented", as used herein, refers to oriented films, wherein the orientation can be produced in one or more of a variety of manners.

As used herein, the phrase "orientation ratio" refers to the multiplication product of the extent to which the plastic film material is expanded in several directions, usually two directions perpendicular to one another. Expansion in the machine direction is herein referred to as "drawing", whereas expansion in the transverse direction is herein referred to as "stretching". For films extruded through an annular die, stretching is obtained by "blowing" the film to produce a bubble. For such films, drawing is obtained by passing the film through two sets of powered nip rolls, with the downstream set having a higher surface speed than the upstream set, with the resulting draw ratio being the surface speed of the downstream set of nip rolls divided by the surface speed of the upstream set of nip rolls. The degree of orientation is also referred to as the orientation ratio, or sometimes as the "racking ratio".

As used herein, the term "monomer" refers to a relatively simple compound, usually containing carbon and of low molecular weight, which can react to form a polymer by combining with itself or with other similar molecules or compounds.

As used herein, the term "comonomer" refers to a monomer which is copolymerized with at least one different monomer in a copolymerization reaction, the result of which is a copolymer.

As used herein, the term "polymer" refers to the product of a polymerization reaction, and is inclusive of homopolymers, copolymers, terpolymers, etc. In general, the layers of a film can consist essentially of a single polymer, or can have still additional polymers together therewith, i.e., blended therewith.

As used herein, the term "homopolymer" is used with reference to a polymer resulting from the polymerization of a single monomer, i.e., a polymer consisting essentially of a single type of repeating unit.

As used herein, the term "copolymer" refers to polymers formed by the polymerization reaction of at least two different monomers. For example, the term "copolymer" includes the copolymerization reaction product of ethylene and an alpha-olefin, such as 1-hexene. However, the term "copolymer" is also inclusive of, for example, the copolymerization of a mixture of ethylene, propylene, 1-hexene, and 1-octene.

As used herein, the term "polymerization" is inclusive of homopolymerizations, copolymerizations, terpolymerizations, etc., and includes all types of copolymerizations such as random, graft, block, etc. In general, the polymers in the films used in accordance with the present invention, can be prepared in accordance with any suitable polymerization process, including slurry polymerization, gas phase polymerization, and high pressure polymerization processes.

Slurry polymerization processes generally use superatmospheric pressures and temperatures in the range of 40°–100° C. In a slurry polymerization, a suspension of solid, particulate polymer is formed in a liquid polymerization medium to which are added ethylene and comonomers, and often hydrogen along with catalyst. The liquid employed in the polymerization medium can be an alkane, cycloalkane, or an aromatic hydrocarbon such as toluene, ethylbenzene or xylene. The medium employed should be liquid under the conditions of polymerization, and relatively inert. Preferably, hexane or toluene is employed.

Alternatively, gas-phase polymerization process utilizes superatmospheric pressure and temperature in the range of about 50°–120° C. Gas phase polymerization can be performed in a stirred or fluidized bed of catalyst and product particles, in a pressure vessel adapted to permit the separation of product particles from unreacted gases. Ethylene, comonomer, hydrogen and an inert diluent gas such as nitrogen can be introduced or recirculated so as to maintain the particles at temperatures of 50°–120° C. Triethylaluminum may be added as needed as a scavenger of water, oxygen, and other impurities. Polymer product can be withdrawn continuously or semicontinuously, at a rate such as to maintain a constant product inventory in the reactor. After polymerization and deactivation of the catalyst, the product polymer can be recovered by any suitable means. In commercial practice, the polymer product can be recovered directly from the gas phase reactor, freed of residual monomer with a nitrogen purge, and used without further deactivation or catalyst removal.

High pressure polymerization processes utilize a catalyst system comprising a cyclopentadienyl-transition metal compound and an alumoxane compound. It is important, in the high-pressure process, that the polymerization temperature be above about 120° C., but below the decomposition temperature of the polymer product. It is also important that the polymerization pressure be above about 500 bar (kg/cm$^2$). In those situations wherein the molecular weight of the polymer product that would be produced at a given set of operating conditions is higher than desired, any of the techniques known in the art for control of molecular weight, such as the use of hydrogen or reactor temperature, may be used in the process of this invention.

As used herein, the term "copolymerization" refers to the simultaneous polymerization of two or more monomers.

As used herein, a copolymer identified in terms of a plurality of monomers, e.g., "propylene/ethylene copolymer", refers to a copolymer in which either monomer may copolymerize in a higher weight or molar percent than the other monomer or monomers. However, the first listed monomer preferably polymerizes in a higher weight percent than the second listed monomer, and, for copolymers which are terpolymers, quadripolymers, etc., preferably the first monomer copolymerizes in a higher weight percent than the second monomer, and the second monomer copolymerizes in a higher weight percent than the third monomer, etc.

As used herein, copolymers are identified, i.e, named, in terms of the monomers from which the copolymers are produced. For example, the phrase "propylene/ethylene copolymer" refers to a copolymer produced by the copolymerization of both propylene and ethylene, with or without additional comonomer(s). A copolymer comprises recurring "polymerization units" derived from the monomers from which the copolymer is produced.

As used herein, the phrase "polymerization unit" refers to a unit of a polymer, as derived from a monomer used in the polymerization reaction. For example, the phrase "alpha-olefin polymerization units" refers to a unit in, for example, an ethylene/alpha-olefin copolymer, the polymerization unit being that "residue" which is derived from the alpha-olefin monomer after it reacts to become a portion of the polymer chain, i.e., that portion of the polymer contributed by an individual alpha-olefin monomer after it reacts to become a portion of the polymer chain.

As used herein, terminology employing a "/" with respect to the chemical identity of a copolymer (e.g., "an ethylene/alpha-olefin copolymer"), identifies the comonomers which are copolymerized to produce the copolymer. As used herein, "ethylene alpha-olefin copolymer" is the equivalent of "ethylene/alpha-olefin copolymer."

As used herein, the phrase "heterogeneous polymer" refers to polymerization reaction products of relatively wide variation in molecular weight and relatively wide variation in composition distribution, i.e., typical polymers prepared, for example, using conventional Ziegler-Natta catalysts. Heterogeneous polymers are useful in various layers of the film used in the present invention. Although there are a few exceptions (such as TAFMER (TM) linear homogeneous ethylene/alpha-olefin copolymers produced by Mitsui Petrochemical Corporation, using Ziegler-Natta catalysts), heterogeneous polymers typically contain a relatively wide variety of chain lengths and comonomer percentages.

As used herein, the phrase "heterogeneous catalyst" refers to a catalyst suitable for use in the polymerization of heterogeneous polymers, as defined above. Heterogeneous catalysts are comprised of several kinds of active sites which differ in Lewis acidity and steric environment Ziegler-Natta catalysts are heterogeneous catalysts. Examples of Ziegler-Natta heterogeneous systems include metal halides activated by an organometallic co-catalyst, such as titanium chloride, optionally containing magnesium chloride, complexed to trialkyl aluminum, as is disclosed in patents such as U.S. Pat. No. 4,302,565, to GOEKE, et al., and U.S. Pat. No. 4,302,566, to KAROL, et. al., both of which are hereby incorporated, in their entireties, by reference thereto.

As used herein, the phrase "homogeneous polymer" refers to polymerization reaction products of relatively narrow molecular weight distribution and relatively narrow composition distribution. Homogeneous polymers are useful in various layers of the multilayer film used in the present invention. Homogeneous polymers are structurally different from heterogeneous polymers, in that homogeneous polymers exhibit a relatively even sequencing of comonomers within a chain, a mirroring of sequence distribution in all chains, and a similarity of length of all chains, i.e., a narrower molecular weight distribution. Furthermore, homogeneous polymers are typically prepared using metallocene, or other single-site type catalysis, rather than using Ziegler Natta catalysts.

More particularly, homogeneous ethylene/alpha-olefin copolymers may be characterized by one or more methods known to those of skill in the art, such as molecular weight distribution ($M_w/M_n$), composition distribution breadth index (CDBI), and narrow melting point range and single melt point behavior. The molecular weight distribution ($M_w/M_n$), also known as polydispersity, may be determined by gel permeation chromatography. The homogeneous ethylene/alpha-olefin copolymers useful in this invention generally has ($M_w/M_n$) of less than 2.7; preferably from about 1.9 to 2.5; more preferably, from about 1.9 to 2.3. The composition distribution breadth index (CDBI) of such homogeneous ethylene/alpha-olefin copolymers will generally be greater than about 70 percent The CDBI is defined as the weight percent of the copolymer molecules having a comonomer content within 50 percent (i.e., plus or minus 50%) of the median total molar comonomer content The CDBI of linear polyethylene, which does not contain a comonomer, is defined to be 100%. The Composition Distribution Breadth Index (CDBI) is determined via the technique of Temperature Rising Elution Fractionation (TREF). CDBI determination clearly distinguishes the homogeneous copolymers used in the present invention (narrow composition distribution as assessed by CDBI values generally above 70%) from VLDPEs available commercially which generally have a broad composition distribution as assessed by CDBI values generally less than 55%. The CDBI of a copolymer is readily calculated from data obtained from techniques known in the art, such as, for example, temperature rising elution fractionation as described, for example, in Wild et. al., *J. Poly. Sci. Poly. Phys. Ed.*, Vol. 20, p. 441 (1982). Preferably, the homogeneous ethylene/alpha-olefin copolymers have a CDBI greater than about 70%, i.e., a CDBI of from about 70% to 99%. In general, the homogeneous ethylene/alpha-olefin copolymers in the multilayer films of the present invention also exhibit a relatively narrow melting point range, in comparison with "heterogeneous copolymers", i.e., polymers having a CDBI of less than 55%. Preferably, the homogeneous ethylene/alpha-olefin copolymers exhibit an essentially singular melting point characteristic, with a peak melting point ($T_m$), as determined by Differential Scanning Colorimetry (DSC), of from about 60° C. to 105° C. Preferably the homogeneous copolymer has a DSC peak $T_m$ of from about 80° C. to 100° C. As used herein, the phrase "essentially single melting point" means that at least about 80%, by weight, of the material corresponds to a single $T_m$ peak at a temperature within the range of from about 60° C. to 105° C., and essentially no substantial fraction of the material has a peak melting point in excess of about 115° C., as determined by DSC analysis. DSC measurements are made on a Perkin Elmer System 7 Thermal Analysis System. Melting information reported are second melting data, i.e., the sample is heated at a programmed rate of 10° C./min. to a temperature below its critical range. The sample is then reheated (2nd melting) at a programmed rate of 10° C./min. The presence of higher melting peaks is detrimental to film properties such as haze, and compromises the chances for meaningful reduction in the seal initiation temperature of the final film.

A homogeneous ethylene/alpha-olefin copolymer can, in general, be prepared by the copolymerization of ethylene and any one or more alpha-olefin. Preferably, the alpha-olefin is a $C_3$–$C_{20}$ alpha-monoolefin, more preferably, a $C_4$–$C_{12}$ alpha-monoolefin, still more preferably, a $C_4$–$C_8$ alpha-monoolefin. Still more preferably, the alpha-olefin comprises at least one member selected from the group consisting of butene-1, hexene-1, and octene-1, i.e., 1-butene, 1-hexene, and 1-octene, respectively. Most preferably, the alpha-olefin comprises octene-1, and/or a blend of hexene-1 and butene-1.

Processes for preparing and using homogeneous polymers are disclosed in U.S. Pat. No. 5,206,075, U.S. Pat. No. 5,241,031, and PCT International Application WO 93/03093, each of which is hereby incorporated by reference thereto, in its entirety. Further details regarding the production and use of homogeneous ethylene/alpha-olefin copolymers are disclosed in PCT International Publication Number WO 90/03414, and PCT International Publication Number WO 93/03093, both of which designate Exxon Chemical Patents, Inc. as the Applicant, and both of which are hereby incorporated by reference thereto, in their respective entireties.

Still another genus of homogeneous ethylene/alpha-olefin copolymers is disclosed in U.S. Pat. No. 5,272,236, to LAI, et. al., and U.S. Pat. No. 5,278,272, to LAI, et al., both of which are hereby incorporated by reference thereto, in their respective entireties.

As used herein, the phrase "homogeneous catalyst" refers to a catalyst suitable for use in the polymerization of homogeneous polymers, as defined above. Homogeneous catalysts are also referred to as "single site catalysts", due to the fact that such catalysts typically have only one type of catalytic site, which is believed to be the basis for the homogeneity of the polymers they catalyze the polymerization of.

As used herein, the term "polyolefin" refers to any polymerized olefin, which can be linear, branched, cyclic, aliphatic, aromatic, substituted, or unsubstituted. More specifically, included in the term polyolefin are homopolymers of olefin, copolymers of olefin, copolymers of an olefin and an non-olefinic comonomer copolymerizable with the olefin, such as vinyl monomers, modified polymers thereof, and the like. Specific examples include polyethylene homopolymer, polypropylene homopolymer, polybutene, ethylene/alpha-olefin copolymer, propylene/alpha-olefin copolymer, butene/alpha-olefin copolymer, ethylene/vinyl acetate copolymer, ethylene/ethyl acrylate copolymer, ethylene/butyl acrylate copolymer, ethylene/methyl acrylate copolymer, ethylene/acrylic acid copolymer, ethylene/methacrylic acid copolymer, modified polyolefin resin, ionomer resin, polymethylpentene, etc. Modified polyolefin resin is inclusive of modified polymer prepared by copolymerizing the homopolymer of the olefin or copolymer thereof with an unsaturated carboxylic acid, e.g., maleic acid, fumaric acid or the like, or a derivative thereof such as the anhydride, ester or metal salt or the like. It could also be obtained by incorporating into the olefin homopolymer or copolymer, an unsaturated carboxylic acid, e.g., maleic acid, fumaric acid or the like, or a derivative thereof such as the anhydride, ester or metal salt or the like.

As used herein, terms identifying polymers, such as "polyamide", "polyester", "polyurethane", etc. are inclusive of not only polymers comprising repeating units derived from monomers known to polymerize to form a polymer of the named type, but are also inclusive of comonomers, derivatives, etc. which can copolymerize with monomers known to polymerize to produce the named polymer. For example, the term "polyamide" encompasses both polymers comprising repeating units derived from monomers, such as caprolactam, which polymerize to form a polyamide, as well as copolymers derived from the copolymerization of caprolactam with a comonomer which when polymerized alone does not result in the formation of a polyamide. Furthermore, terms identifying polymers are also inclusive of mixtures, blends, etc. of such polymers with other polymers of a different type.

As used herein, the phrase "modified polymer", as well as more specific phrases such as "modified ethylene/vinyl acetate copolymer", and "modified polyolefin" refer to such polymers having an anhydride functionality, as defined immediately above, grafted thereon and/or copolymerized therewith and/or blended therewith. Preferably, such modified polymers have the anhydride functionality grafted on or polymerized therewith, as opposed to merely blended therewith.

As used herein, the phrase "anhydride-containing polymer" and "anhydride-modified polymer", refer to one or more of the following: (1) polymers obtained by copolymerizing an anhydride-containing monomer with a second, different monomer, and (2) anhydride grafted copolymers, and (3) a mixture of a polymer and an anhydride-containing compound.

As used herein, the phrase "ethylene alpha-olefin copolymer", and "ethylene/alpha-olefin copolymer", refer to such heterogeneous materials as linear low density polyethylene (LLDPE), and very low and ultra low density polyethylene (VLDPE and ULDPE); and homogeneous polymers such as metallocene-catalyzed EXACT (TM) linear homogeneous ethylene/alpha olefin copolymer resins obtainable from the Exxon Chemical Company, of Baytown, Tex., and TAFMER (TM) linear homogeneous ethylene/alpha-olefin copolymer resins obtainable from the Mitsui Petrochemical Corporation. All these materials generally include copolymers of ethylene with one or more comonomers selected from $C_4$ to $C_{10}$ alpha-olefin such as butene-1 (i.e., 1-butene), hexene-1, octene-1, etc. in which the molecules of the copolymers comprise long chains with relatively few side chain branches or cross-linked structures. This molecular structure is to be contrasted with conventional low or medium density polyethylenes which are more highly branched than their respective counterparts. The heterogeneous ethylene/alpha-olefin commonly known as LLDPE has a density usually in the range of from about 0.91 grams per cubic centimeter to about 0.94 grams per cubic centimeter. Other ethylene/alpha-olefin copolymers, such as the long chain branched homogeneous ethylene/alpha-olefin copolymers available from The Dow Chemical Company, known as AFFINITY (TM) resins, are also included as another type of homogeneous ethylene/ alpha-olefin copolymer useful in the present invention.

In general, the ethylene/alpha-olefin copolymer comprises a copolymer resulting from the copolymerization of from about 80 to 99 weight percent ethylene and from 1 to 20 weight percent alpha-olefin. Preferably, the ethylene/alpha-olefin copolymer comprises a copolymer resulting from the copolymerization of from about 85 to 95 weight percent ethylene and from 5 to 15 weight percent alpha-olefin.

As used herein, the phrases "inner layer" and "internal layer" refer to any layer, of a multilayer film, having both of its principal surfaces directly adhered to another layer of the film.

As used herein, the phrase "outer layer" refers to any film layer of film having less than two of its principal surfaces directly adhered to another layer of the film. The phrase is inclusive of monolayer and multilayer films. In multilayer films, there are two outer layers, each of which has a principal surface adhered to only one other layer of the multilayer film. In monolayer films, there is only one layer, which, of course, is an outer layer in that neither of its two principal surfaces are adhered to another layer of the film.

As used herein, the phrase "inside layer" refers to the outer layer, of a multilayer film packaging a product, which is closest to the product, relative to the other layers of the multilayer film. "Inside layer" also is used with reference to the innermost layer of a plurality of concentrically arranged layers simultaneously coextruded through an annular die.

As used herein, the phrase "outside layer" refers to the outer layer, of a multilayer film packaging a product, which is furthest from the product relative to the other layers of the multilayer film. "Outside layer" also is used with reference to the outermost layer of a plurality of concentrically arranged layers simultaneously coextruded through an annular die.

As used herein, the term "adhered" is inclusive of films which are directly adhered to one another using a heat seal or other means, as well as films which are adhered to one another using an adhesive which is between the two films.

As used herein, the phrase "directly adhered", as applied to film layers, is defined as adhesion of the subject film layer to the object film layer, without a tie layer, adhesive, or other layer therebetween. In contrast, as used herein, the word "between", as applied to a film layer expressed as being between two other specified layers, includes both direct adherence of the subject layer between to the two other layers it is between, as well as including a lack of direct adherence to either or both of the two other layers the subject layer is between, i.e., one or more additional layers can be imposed between the subject layer and one or more of the layers the subject layer is between.

As used herein, the term "extrusion" is used with reference to the process of forming continuous shapes by forcing a molten plastic material through a die, followed by cooling or chemical hardening. Immediately prior to extrusion through the die, the relatively high-viscosity polymeric material is fed into a rotating screw of variable pitch, i.e., an extruder, which forces the polymeric material through the die.

As used herein, the term "coextrusion" refers to the process of extruding two or more materials through a single die with two or more orifices arranged so that the extrudates merge and weld together into a laminar structure before chilling, i.e., quenching. Coextrusion can be employed in film blowing, free film extrusion, and extrusion coating processes.

As used herein, the phrase "machine direction", herein abbreviated "MD", refers to a direction "along the length" of the film, i.e., in the direction of the film as the film is formed during extrusion and/or coating.

As used herein, the phrase "transverse direction", herein abbreviated "TD", refers to a direction across the film, perpendicular to the machine or longitudinal direction.

As used herein, the phrase "free shrink" refers to the percent dimensional change in a 10 cm×10 cm specimen of film, when subjected to selected heat, as measured by ASTM D 2732, as known to those of skill in the art.

As used herein, the word "grease" refers to any and all oil, fat, and/or other liquid which can have an adverse effect upon the optical characteristics of a film. As used herein, the phrase "grease-resistant layer" refers to any layer of a multilayer film which is capable of substantially preventing whitening, haziness, and/or delamination, due to contact of the film with grease.

A portion of the multilayer film of the present invention is preferably irradiated to induce crosslinking. In the irradiation process, the film is subjected to an energetic radiation treatment, such as corona discharge, plasma, flame, ultraviolet, X-ray, gamma ray, beta ray, and high energy electron treatment, which induce cross-linking between molecules of the irradiated material. The irradiation of polymeric films is disclosed in U.S. Pat. No. 4,064,296, to BORNSTEIN, et. al., which is hereby incorporated in its entirety, by reference thereto. BORNSTEIN, et. al. discloses the use of ionizing radiation for crosslinking the polymer present in the film.

To produce crosslinking, a suitable radiation dosage of high energy electrons, preferably using an electron accelerator, with a dosage level being determined by standard dosimetry methods. Other accelerators such as a Vander Graff or resonating transformer may be used. The radiation is not limited to electrons from an accelerator since any ionizing radiation may be used. The ionizing radiation can be used to crosslink the polymers in the film. Preferably, the film is irradiated at a level of from 2–15 MR, more preferably 2–10 MR. As can be seen from the descriptions of preferred films for use in the present invention, the most preferred amount of radiation is dependent upon the film and its end use.

As used herein, the phrases "corona treatment" and "corona discharge treatment" refer to subjecting the surfaces of thermoplastic materials, such as polyolefins, to corona discharge, i.e., the ionization of a gas such as air in close proximity to a film surface, the ionization initiated by a high voltage passed through a nearby electrode, and causing oxidation and other changes to the film surface, such as surface roughness.

Corona treatment of polymeric materials is disclosed in U.S. Pat. No. 4,120,716, to BONET, issued Oct. 17, 1978, herein incorporated in its entirety by reference thereto. BONET discloses improved adherence characteristics of the surface of polyethylene by corona treatment, to oxidize the polyethylene surface. U.S. Pat. No. 4,879,430, to HOFFMAN, also hereby incorporated in its entirety by reference thereto, discloses the use of corona discharge for the treatment of plastic webs for use in meat cook-in packaging, with the corona treatment of the inside surface of the web to increase the adhesion of the meat to the adhesion of the meat to the proteinaceous material.

A preferred film according to the present invention contains crosslinking which has been enhanced by a reaction product of a polyene monomer and a $C_3$ to $C_8$ olefinic monomer. Such films are disclosed in copending U.S. Ser. No. 60/016,800, filed Apr. 26, 1996, entitled "FILM WITH ENHANCED CROSSLINKING EFFICIENCY AND METHOD OF MAKING SAME," which is hereby incorporated in its entirety, by reference thereto.

It has been found that irradiation of ethylene/alpha-olefin copolymer outer film layers renders the film grease-resistant Accordingly, the multilayer film according to the present invention can have one or two outer irradiated ethylene/alpha-olefin layers, in order to render the film resistant to optical property degradation from grease exposure on either outer surface of the film.

Since it is preferred to avoid irradiation of the polyvinylidene chloride-containing layer, and since the use of certain additives in an outer layer comprising ethylene/alpha-olefin copolymer renders the layer grease-resistant without the need to irradiate the layer, it is preferred to use such an additive on the outer film layer which is added in the extrusion coating step. In this preferred film, the other outer film layer, which is the inside coextruded layer, is preferably rendered grease-resistant by irradiation, in order to avoid the use of a more expensive additive, as well as to eliminate the need to blend the additive with polymer making up this inside coextruded layer.

Unless stated otherwise, all percentages disclosed above are based on weight, rather than volume.

Preferably, the film according to the present invention comprises a total of from 2 to 20 layers; more preferably, from 2 to 12 layers; and still more preferably, from 4 to 9 layers. Although the multilayer film of the present invention can have any total thickness desired, so long as the film provides the desired properties for the particular packaging operation in which the film is used, e.g. optics, modulus, seal strength, etc.

The invention is illustrated by the following examples, which are provided for the purpose of representation, and are not to be construed as limiting the scope of the invention. Unless stated otherwise, all percentages, parts, etc. are by weight.

Film No. 1

FIG. 1 illustrates a cross-sectional view of a preferred multilayer film 20 for use as the stock material from which a package can be made. First layer 21 is an outer film layer which preferably serves as an inside food-contact layer which is irradiated so that it is grease-resistant Second layer 22 serves as a bulk layer, and is preferably irradiated. Third layer 23 serves as a barrier to $O_2$. Fourth layer 24 serves as a tie layer. Fifth layer 25 serves as a bulk layer. Sixth layer 26 is an outer layer which preferably serves as an outside abuse layer, and which, preferably, is also grease-resistant.

One preferred embodiment of multilayer film 20 has a physical structure, in terms of number of layers, layer thickness, and layer arrangement, and a chemical composition in terms of the various polymers, etc. present in each of the layers, as set forth in Table I, below. This film is herein designated "Film No. 1", and is an example of a multilayer film according to the present invention.

TABLE I

Characteristics of Film No. 1

| FIG. 1 designation | layer function | chemical identity | layer thickness (mils) |
|---|---|---|---|
| 26 | outside, grease-resistant, & abuse-resistant | 75% homogeneous ethylene/alpha-olefin #1; 25% homogeneous ethylene/alpha-olefin #2 | 0.12 |

TABLE I-continued

Characteristics of Film No. 1

| FIG. 1 designation | layer function | chemical identity | layer thickness (mils) |
|---|---|---|---|
| 25 | bulk | EVA #1 | 0.25 |
| 24 | tie | EVA #2 | 0.12 |
| 23 | O$_2$-barrier | PVDC Blend #1 | 0.18 |
| 22 | bulk & tie | irradiated EVA #1 | 0.82 |
| 21 | inside & grease-resistance, & sealing | irradiated homogeneous ethylene/alpha-olefin #1 | 0.54 |

Long chain branched homogeneous ethylene/alpha-olefin #1 was AFFINITY PF1140 (TM) long chain branched homogeneous ethylene/alpha-olefin copolymer having a density of 0.895 g/cc and a melt index of 1.6, this copolymer being obtained from The Dow Chemical Company of Midland, Mich. Homogeneous ethylene/alpha-olefin #2 was TAFMER XR 107L (TM) linear homogeneous ethylene/alpha-olefin copolymer plastomer resin having a density of 0.89 g/cc and a melt flow index of 7.0, this polymer being produced by Mitsui Sekka, of Japan, and obtained from the Mitsui Petrochemicals (America), Ltd., of N.Y., N.Y.

EVA #1 was ESCORENE XV65.93 (TM) ethylene/vinyl acetate copolymer having a vinyl acetate content of 15%, obtained from Exxon Chemical, of Baytown, Tex. EVA #2 was ELVAX 3175 GC (TM) ethylene/vinyl acetate copolymer having a vinyl acetate content of 28 weight percent, also obtained from E. I. DuPont de Nemours, of Wilmington, Del.

PVDC Blend #1 was a composition comprising: (a) about 96 weight percent DOW MA134 (TM) vinylidene chloride/methyl acrylate copolymer having a methyl acrylate content of 8.5%, obtained from The Dow Chemical Company, of Midland, Mich.; (b) about 2 weight percent PLAS CHEK 775 (TM) epoxidized soybean oil, obtained from Ferro Chemicals, of Bedford, Ohio; and, (c) about 2 weight percent METABLEN L1000 (TM) acrylate blend, obtained from Elf Atochem, of Philadelphia, Pa. METABLEN L1000 (TM) comprises about 53 weight percent methyl methacrylate ("MMA"), 29 weight percent butyl methacrylate ("BMA"), and 19 weight percent butyl acrylate ("BA").

Figure 2:
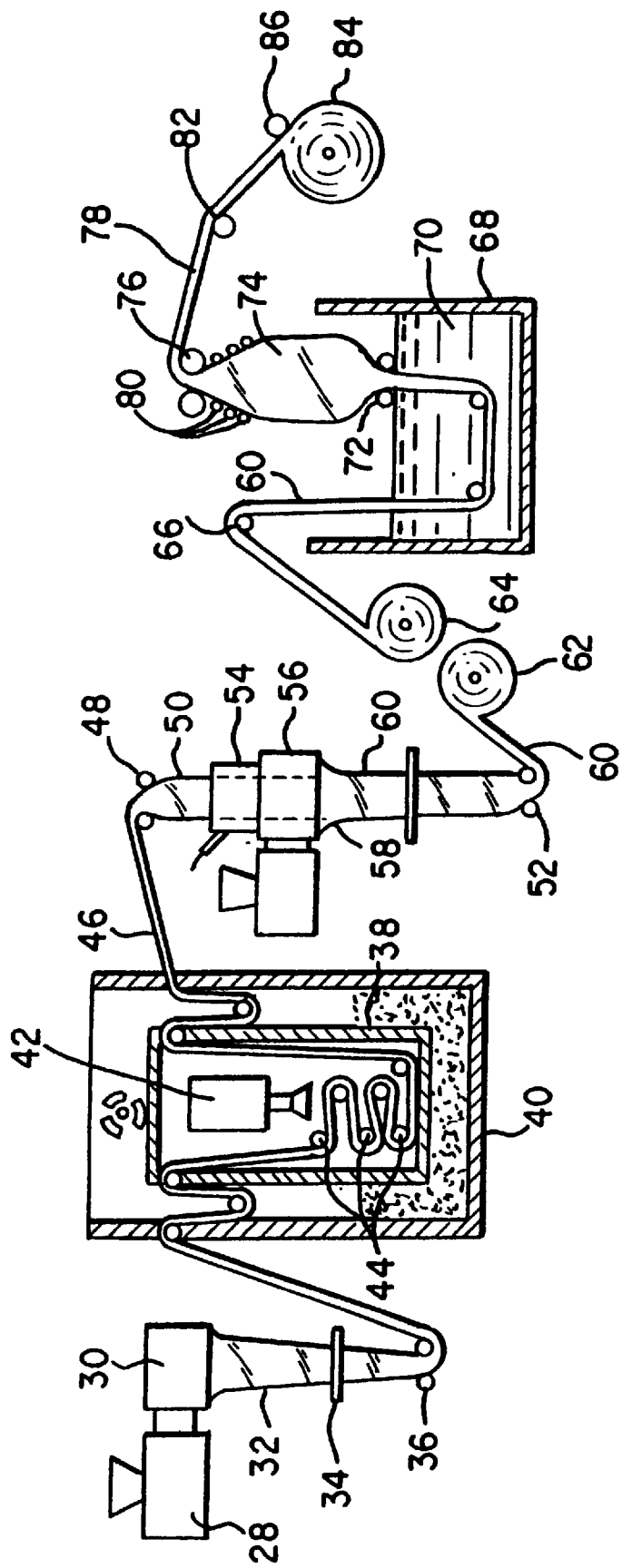
FIG. 2 illustrates a schematic view of a preferred process for making a multilayer film according to FIG. 1, as well as other multilayer films according to the present invention.

Film No. 1 was produced in accordance with a process schematically illustrated in FIG. 2. In the process illustrated in FIG. 2, solid polymer beads (not illustrated) are fed to a plurality of extruders 28 (for simplicity, only one extruder is illustrated). Inside extruders 28, the polymer beads are forwarded, melted, and degassed, following which the resulting bubble-free melt is forwarded into die head 30, and extruded through an annular die, resulting in tubing 32 which is preferably about 24 mils thick.

After cooling or quenching by water spray from cooling ring 34, tubing 32 is collapsed by pinch rolls 36, and is thereafter fed through irradiation vault 38 surrounded by shielding 40, where tubing 32 is irradiated with high energy electrons (i.e., ionizing radiation) from iron core transformer accelerator 42. Tubing 32 is guided through irradiation vault 38 on rolls 44. Preferably, tubing 32 is irradiated to a level of from about 3 to 8 MR.

After irradiation, irradiated tubing 46 is directed through pinch rolls 48, following which irradiated tubing 46 is slightly inflated, resulting in trapped bubble 50. However, at trapped bubble 50, the tubing is not significantly drawn longitudinally, as the surface speed of nip rolls 52 are about the same speed as nip rolls 48. Furthermore, irradiated tubing 46 is inflated only enough to provide a substantially circular tubing without significant transverse orientation, i.e., without stretching.

Slightly inflated, irradiated tubing 50 is passed through vacuum chamber 54, and thereafter forwarded through coating die 56. Second tubular film 58 is melt extruded from coating die 56 and coated onto slightly inflated, irradiated tube 50, to form two-ply tubular film 60. Second tubular film 58 preferably comprises an O$_2$ barrier layer, which does not pass through the ionizing radiation. Further details of the above-described coating step are generally as set forth in U.S. Pat. No. 4,278,738, to BRAX et al., which is hereby incorporated by reference thereto, in its entirety.

After irradiation and coating, two-ply tubing film 60 is wound up onto windup roll 62. Thereafter, windup roll 62 is removed and installed as unwind roll 64, on a second stage in the process of making the tubing film as ultimately desired. Two-ply tubular film 60, from unwind roll 64, is unwound and passed over guide roll 66, after which two-ply tubular film 60 passes into hot water bath tank 68 containing hot water 70. The now collapsed, irradiated, coated tubular film 60 is submersed in hot water 70 (having a temperature of about 185° F.) for a retention time of at least about 30 seconds, i.e., for a time period in order to bring the film up to the desired temperature for biaxial orientation. Thereafter, irradiated tubular film 60 is directed through nip rolls 72, and bubble 74 is blown, thereby transversely stretching tubular film 60. Furthermore, while being blown, i.e., transversely stretched, nip rolls 76 draw tubular film 60 in the longitudinal direction, as nip rolls 76 have a surface speed higher than the surface speed of nip rolls 72. As a result of the transverse stretching and longitudinal drawing, irradiated, coated biaxially-oriented blown tubing film 78 is produced, this blown tubing preferably having been both stretched in a ratio of from about 1:1.5–1:6, and drawn in a ratio of from about 1:1.5–1:6. More preferably, the stretching and drawing are each performed a ratio of from about 1:2–1:4. The result is a biaxial orientation of from about 1:2.25–1:36, more preferably, 1:4–1:16. While bubble 74 is maintained between pinch rolls 72 and 76, blown tubing 78 is collapsed by rolls 80, and thereafter conveyed through pinch rolls 76 and across guide roll 82, and then rolled onto wind-up roll 84. Idler roll 86 assures a good wind-up.

Film No. 2 and Film No. 3

"Film No. 2", and "Film No. 3", i.e., two alternative preferred films according to the present invention, are otherwise identical (in composition, thickness, etc.) to Film No. 1 as set forth in Table I, the difference being the substitution of the composition of outside layer 26 with either of the following two compositions:

Film No. 2
   70% homogeneous ethylene/alpha-olefin #1;
   30% CEFOR SRD4-105 (TM) polypropylene/butene copolymer, obtained from Shell Chemical Co., of Houston Tex. (hereinafter
   "propylene/butene copolymer #1)
Film No. 3
   70% homogeneous ethylene/alpha-olefin #1;
   30% DURAFLEX DP1560 (TM) polybutylene copolymer, obtained from Shell Chemical Co. of Houston, Tex. (hereinafter "polybutylene #1")

Furthermore, in layer 21 and layer 26 of each of Film Nos. 1, 2, and 3, described above, "homogeneous ethylene/alpha olefin #1" can be substituted with XU59190.00, a proprietary experimental long chain branched homogeneous ethylene/alpha-olefin copolymer having a density of 0.897 g/cc and a melt index of 2.7, obtained under a development agreement with The Dow Chemical Company of Midland, Mich. (hereinafter, "long chain branched homogeneous ethylene/alpha-olefin copolymer #3"). The information concerning XU59190.00 and the evaluation results of film/bag containing the experimental polymer which are set forth in this example have been approved for release by Dow.

In layer 22 and layer 25 of each of Film Nos. 1, 2, and 3, described above, "EVA #1" can be substituted with ELVAX EP4062-2 ethylene/vinyl acetate copolymer, obtained from E. I. DuPont de Nemours, of Wilmington, Del.

In layer 24 of each of Film Nos. 1, 2, and 3, described above, "EVA #2" can be substituted with EMAC SP2305 (TM) methyl acrylate/ethylene methyl acrylate copolymer, obtained from the Chevron Chemical Company, of Houston, Tex.

Each of Film Nos. 1, 2, and 3 was produced by the process illustrated in FIG. 2.

Film Nos. 4, 5, 6, and 7

Figure 3:
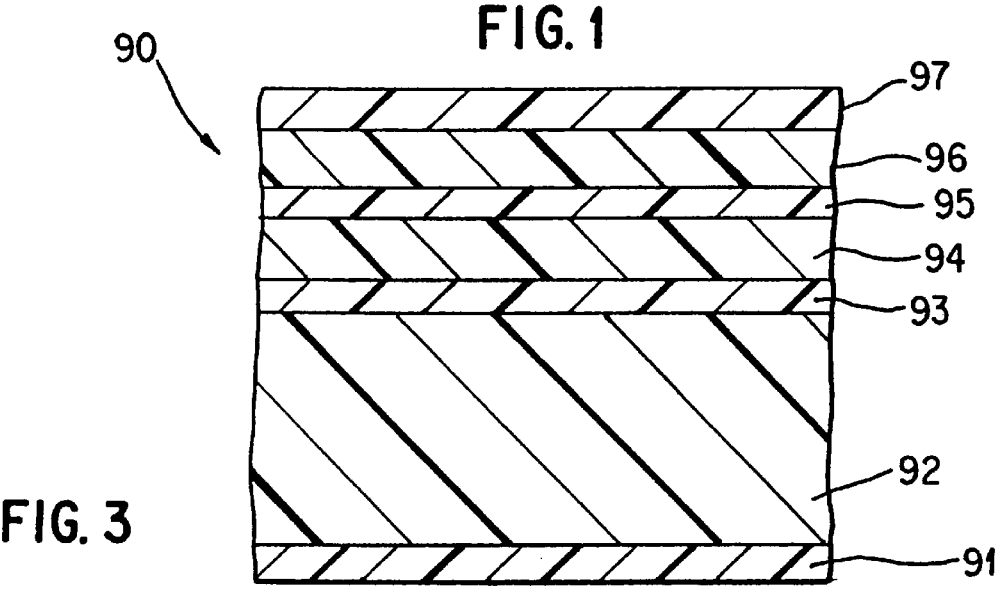
FIG. 3 illustrates a schematic cross-sectional view of a multilayer Film Nos. 4, 5, 6, and 7, described below.

Film Nos. 4, 5, 6, and 7 are alternative preferred multilayer films according to the present invention. Each of Films Nos. 4, 5, 6, and 7 was a seven-layer film, and a cross-sectional view of multilayer film 90, shown in FIG. 3, is representative of each of Film Nos. 4, 5, 6, and 7. Layers 91–97, as illustrated in FIG. 3, are described in Table II, below, which discloses the function, composition, and relative thickness of each of the layers of Films Nos. 4, 5, 6, and 7.

TABLE II

| Layer number | layer function | chemical identity | percent of total film thickness |
|---|---|---|---|
| 97 | outside, grease-resistant, & abuse-resistant | 75% homogeneous ethylene/alpha-olefin #1; 25% homogeneous ethylene/alpha-olefin #2 | 6.2 |
| 96 | bulk | homogeneous ethylene/alpha-olefin #4 | 11.2 |
| 95 | tie | EMA #1 | 4.2 |
| 94 | O$_2$-barrier | PVDC Blend #1 | 9.0 |
| 93 | tie | irradiated EVA #1 | 4.2 |
| 92 | bulk | irradiated homogeneous ethylene/alpha-olefin #4 | 40.3 |
| 91 | inside & grease-resistant and seal | irradiated homogeneous ethylene/alpha-olefin #3 | 6.0 |

Each of Films Nos. 4, 5, 6, and 7 had a free shrink, at 185° F., of 100 to 107%. Furthermore, each of Film Nos. 4, 5, 6, and 7 was also produced by the process illustrated in FIG. 2. Although each of Films Nos. 4–7 had the number of layers, relative thickness of layers, and layer chemical composition as set forth in Table II, above, Films No. 4–7 differed from one another in total thickness. Film No. 4 had a total thickness of 2.0 mils; Film No. 5 had a total thickness of 1.75 mils; Film No. 6 had a total thickness of 1.50 mils; and Film No. 7 has a total thickness of 1.25 mils.

In each of Film Nos. 4, 5, 6, and 7, the chemical compositions identified as: "homogeneous ethylene/alpha-olefin #1", "homogeneous ethylene/alpha-olefin #2", "homogeneous ethylene/alpha-olefin copolymer #3", "EVA #1", and "PVDC Blend #1", are the same compositions set forth above in the description of Film No. 1. Long chain branched homogeneous ethylene/alpha-olefin #4 was XU59220.04, a proprietary experimental long chain branched homogeneous ethylene/alpha-olefin copolymer having a density of 0.895 g/cc and a melt index of 0.9, obtained under a development agreement with The Dow Chemical Company of Midland, Mich. The information concerning XU59220.04 and the evaluation results of film/bag containing the experimental polymer which are set forth in this example have been approved for release by Dow.

"EMA #1" was SP2305 (TM) ethylene/methyl acrylate copolymer having a methyl acrylate content of 20%, obtained from the Chevron Chemical Company, of Houston, Tex.

Film No. 8

Figure 4:
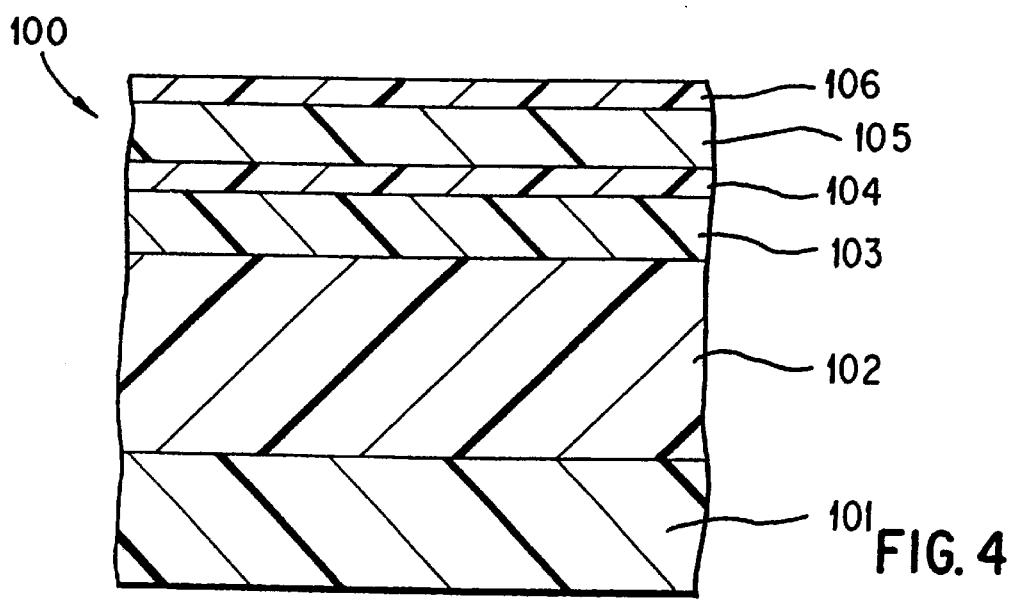
FIG. 4 illustrates a schematic cross-sectional view of a multilayer Film No. 8, described below.

Film No. 8 was yet another preferred multilayer film according to the present invention. Film No. 8 had six layers and a total thickness of 2.0 mils. A schematic cross-sectional view of Film No. 8 is provided as multilayer film 100, illustrated in FIG. 4, which contains layers 101–106. Table III, below, discloses the function, composition, and relative thickness of each of layers 81–86.

TABLE III

| Layer number | layer function | chemical identity | layer thickness (mils) |
|---|---|---|---|
| 106 | outside, & abuse-resistant | 98% homogeneous ethylene/alpha-olefin #1; 2% antiblock masterbatch #1 | 0.12 |
| 105 | bulk | EVA #1 | 0.25 |
| 104 | tie | EMA #1 | 0.12 |
| 103 | O$_2$-barrier | PVDC Blend #1 | 0.18 |
| 102 | bulk & tie | irradiated EVA #1 | 0.80 |
| 101 | inside & grease-resistant, & sealing | irradiated homogeneous ethylene/alpha-olefin #4 | 0.53 |

Although Film No. 8 exhibited very good optical properties upon shrinkage, it should be noted that the outside layer of Film No. 8, i.e., layer 106, was not grease-resistant, and therefore is best utilized in an environment in which it does not contact grease. As with Film Nos. 1–7, Film No. 8 was also produced by the process illustrated in FIG. 2.

Film No. 9 and Film No. 10

Figure 5:
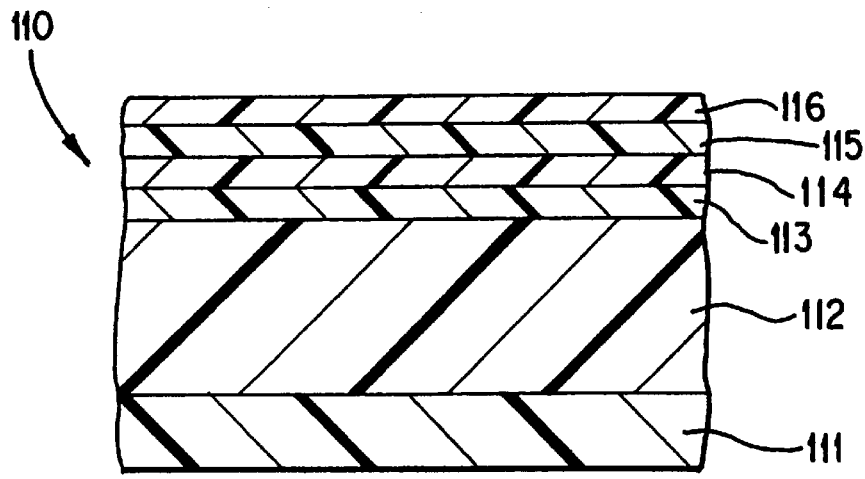
FIG. 5 illustrates a schematic cross-sectional view of a multilayer Film Nos. 9 and 10, described below.

Although Film No. 9 and Film No. 10 appear, from Table IV and the discussion below, to be very similar films, Film No. 9 is another film according to the present invention, whereas Film No. 10 is a comparative film, i.e., a film lacking shrink-compatibility. Film Nos. 9 and 10 have the following characteristics in common: (a) six layers; (b) a total film thickness (after orientation and before shrinkage) of about 2.0 mils; (c) a free shrink, at 185° F., of about 100 percent; and, (d) five of six layers in the same order, having the same chemical composition, and being of the same relative and absolute thickness. Six-layer film 110, schematic cross-sectional view of which is provided in FIG. 5, represents Film No. 9, and contains layers 111–116. Film No. 10 is identical to Film No. 9 in terms of number of layers, order of layers, and thickness of layers, with the exception that the outside layer of Film No. 10 has a different chemical composition from that of outside layer 116 of Film No. 9. Outside layer 116 of Film No. 9 was composed of 100 weight percent EVA #3, whereas outside layer 86 of Film No. 10 was composed of 100 weight percent EVA #4.

Table IV, below, provides the function, composition, and relative thickness of each of layers 111–116 of Film No. 9.

TABLE IV

| FIG. 5 layer designation | layer function | chemical identity | layer thickness (mils) |
|---|---|---|---|
| 116 | outside & abuse | EVA #3 | 0.17 |
| 115 | bulk | EVA #3 | 0.17 |
| 114 | tie | EVA #2 | 0.17 |
| 113 | $O_2$-barrier | PVDC Blend #1 | 0.20 |
| 112 | bulk & tie | irradiated EVA #3 | 1.01 |
| 111 | inside & grease-resistance, & sealing | irradiated EVA #3 | 0.29 |

EVA #3 was EP 4062-2 (TM) ethylene/vinyl acetate copolymer having a vinyl acetate content of 15%, a density of 0.938 g/cc, and a melt index of 2.5, and was obtained from E. I. DuPont de Nemours, of Wilmington, Del. EVA #4, present in outside layer 96 of Film No. 10, was ELVAX 3128 (TM) ethylene/vinyl acetate copolymer having a vinyl acetate content of 8.9 percent, a density of 0.928 g/cc, a melt index of 2.0, and was also obtained from DuPont. EVA #4 is not shrink-compatible with the other layers of Film No. 10. Furthermore, it should be noted that EVA #4 had a major DSC peak of about 96° C., whereas each of the other layers of both Film No. 9 and Film No. 10, with the exception of the layer comprising PVDC Blend #1 (discussed above as a "zig-zag" layer), have a major DSC peak of about 89° C.

Figure 6A:
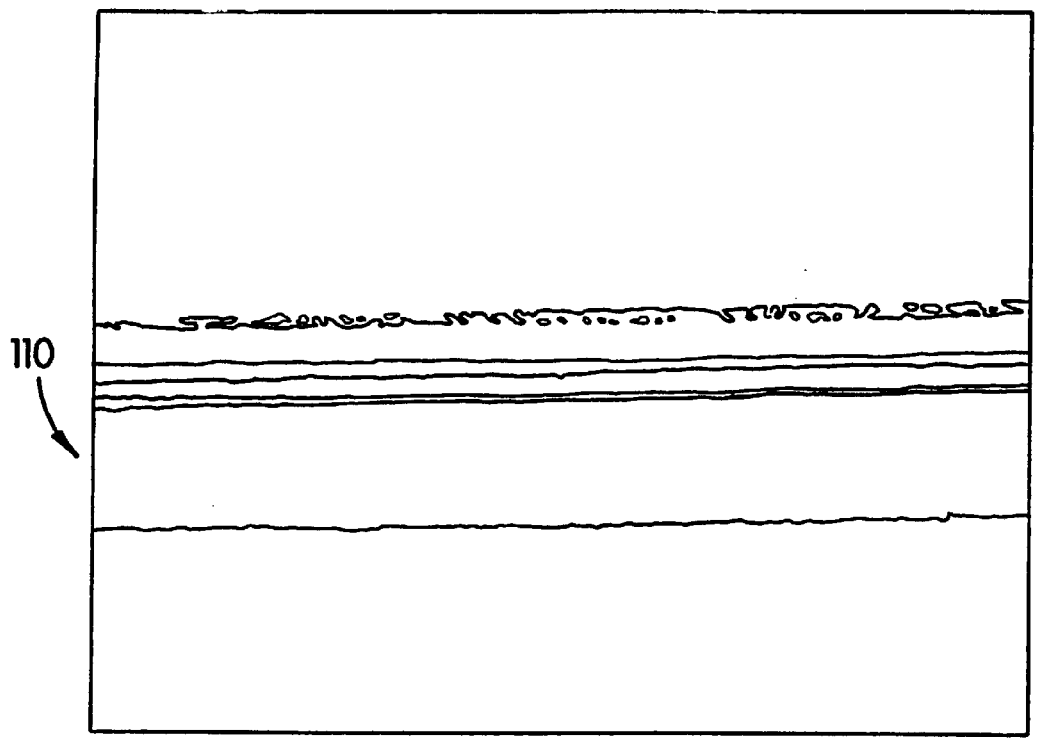
FIG. 6A illustrates a cross-sectional scanning electron microscope (SEM) view of Film No. 9.
Figure 6B:
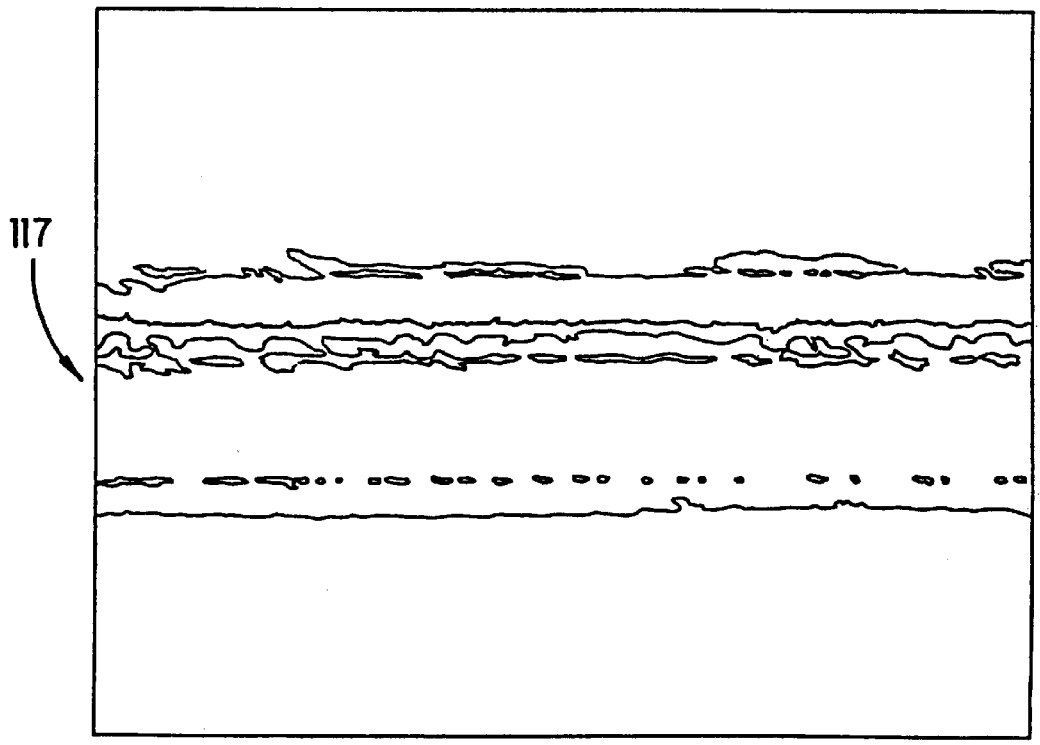
FIG. 6B illustrates a cross-sectional scanning electron microscope (SEM) view of Film No. 10.

FIGS. 6A is a 200×SEM view of multilayer film 110, i.e., Film No. 9, and FIG. 6B is a 200×SEM view of multilayer film 117, i.e., Film No. 10. FIGS. 6A and 6B illustrate one of the reasons for shrink incompatibility: a rough outer surface, as is found in Film No. 10 illustrated in FIG. 6B. As illustrated in FIGS. 6A and 6B, Film No. 9 and Film No. 10 had each been subjected to a the standardized shrink-compatibility test (as described above), with the cross-sectional views of FIGS. 6A and 6B illustrating the films after they were subjected to restrained shrink under the standardized shrink-compatibility test conditions. As is apparent in FIG. 6B, the uppermost surface of the restrained-shrink portion of Film No. 10 was rough, relative to the uppermost surface of the restrained-shrink portion of Film No. 9, illustrated in FIG. 6A. The rough surface of Film No. 10 was believed to be the cause of the higher haze level exhibited by Film No. 10, which lacked shrink-compatibility.

Although Film No. 9, as illustrated in FIG. 6A, and Film No. 10, as illustrated in FIG. 6B, were shrunk approximately the same amount, it was not understood why the PVDC layer of Film No. 9 appears to exhibit substantially less zig-zag than the PVDC layer of Film No. 10. However, it is believed that the zig-zag apparent in FIG. 6B is not the cause of the relatively lower optical properties exhibited by Film No. 10.

Optical Properties of Film Nos. 1–4 and 8–10

Each of Film Nos. 1–4 and 8–10 were subjected to the standardized shrink-compatibility test described in detail below. Then various optical properties each of these films were measured on film portions which had undergone restrained shrinkage. The optical properties measured included total transmission, haze, clarity, and gloss.

The shrink-compatibility of Film Nos. 5–7 was not determined because the standardized shrink-compatibility test calls for the shrinkage of a film having a total thickness of 2.0 mils. It should be noted that since Film No. 4 had a thickness of 2.0 mil, the shrink-compatibility testing of Film No. 4 provides results for determining whether all layers of Film Nos. 5–7 are shrink compatible. Each of Film Nos. 4–7 had a free shrink, at 185° F., of 100 percent.

Table V, below, sets forth optical property results obtained upon restrained shrinkage at 185° F. for Film Nos. 1–4, 8, and 9, versus Comparative Film No. 10, each of these films being described in detail above.

TABLE V

OPTICAL PROPERTIES UPON RESTRINED SHRINK AT 185° F.

| Optical Property | Film No. 1 | Film No. 2 | Film No. 3 | Comparative Film No. 10 |
|---|---|---|---|---|
| Total Transmission (percent) | 93.8 | 94.0 | 93.8 | 93 |
| Haze (percent) | 11.3 | 9.2 | 12.0 | 59.4 |
| Clarity (percent) | 4.4 | 3.7 | 1.5 | 0.1 |
| Gloss (percent) | 63 | 63 | 51 | 10 |

| Optical Property | Film No. 4 | Film No. 8 | Film No. 9 | Comparative Film No. 10 |
|---|---|---|---|---|
| Total Transmission (percent) | 93.6 | 93.8 | 93.2 | 93 |
| Haze (percent) | 14.3 | 6.0 | 21.1 | 59.4 |
| Clarity (percent) | 1.9 | 4.2 | 2.4 | 0.1 |
| Gloss (percent) | 51 | 75 | 39 | 10 |

Total transmission and clarity (transmission) were both determined by ASTM D 1746, as set forth in the 1990, *Annual Book of ASTM Standards*, Vol. 08.02, pp. 76–78, which is hereby incorporated, in its entirety, by reference thereto. Haze was determined by ASTM D 1003, as discussed above. Gloss was determined by ASTM D 2457, as set forth in the 1990 *Annual Book of ASTM Standards*, Vol. 08.02, pp. 266–269, which is hereby incorporated, in its entirety, by reference thereto.

The optical property results provided in Table IV indicate that Film Nos. 1–4, 8 and 9 exhibited various haze levels, from a low of 6 percent haze for Film No. 8, to a high of 21.1 percent haze for Film No. 9. In contrast, Film No. 10, a comparative film, exhibited a haze level of 59.4 percent In addition, Table V indicates that the shrink-compatible films according to the present invention exhibited better total transmission, clarity, and gloss than comparative Film No. 10.

Film Nos. 11–14

Figure 7:
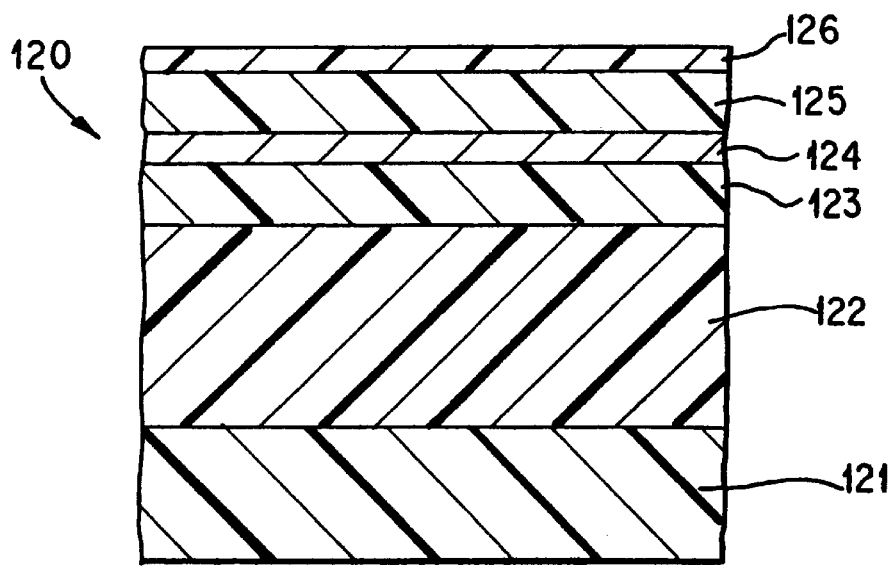
FIG. 7 illustrates a schematic cross-sectional view of a multilayer Film Nos. 11, 12, and 13, described below.

Film Nos. 11, 12, 13 are films according to the present invention, and Film No. 14 is a comparative prior art film. FIG. 7 is a schematic cross-sectional view of multilayer film 120, which is representative of the cross-sections of Film Nos. 11, 12, and 13, each of these films containing layers 121–126.

Film Nos. 11, 12, and 13 were each 6-layer films having a thickness of 2 mils. Film No. 11 had a physical structure, in terms of layer arrangement, function, chemical composition, and thickness, as set forth in Table VI, below.

TABLE VI

Characteristics of Film No. 11

| FIG. 7 layer designation | layer function | chemical identity | layer thickness (mils) |
|---|---|---|---|
| 126 | outside, grease-resistant, & abuse-resistant | 80% homogeneous ethylene/alpha-olefin #4; 20% homogeneous ethylene/alpha-olefin #2 | 0.12 |
| 125 | bulk | EVA #3 | 0.25 |
| 124 | tie | EVA #2 | 0.12 |
| 123 | $O_2$-barrier | PVDC Blend #1 | 0.18 |
| 122 | bulk & tie | irradiated EVA #3 | 0.78 |
| 121 | inside & grease-resistance, & sealing | irradiated EVA #3 | 0.54 |

Film No. 12 was identical to Film No. 11, except in Film No. 12, outside layer 126 was composed of 70% homogeneous ethylene/alpha-olefin #1 and 30% propylene/butene copolymer #1. Film No. 13 was identical to Film No. 11, except that in Film No. 13, outside layer 126 was composed of 70% homogeneous ethylene/alpha-olefin #1 and 30% polybutylene #1.

Figure 8:
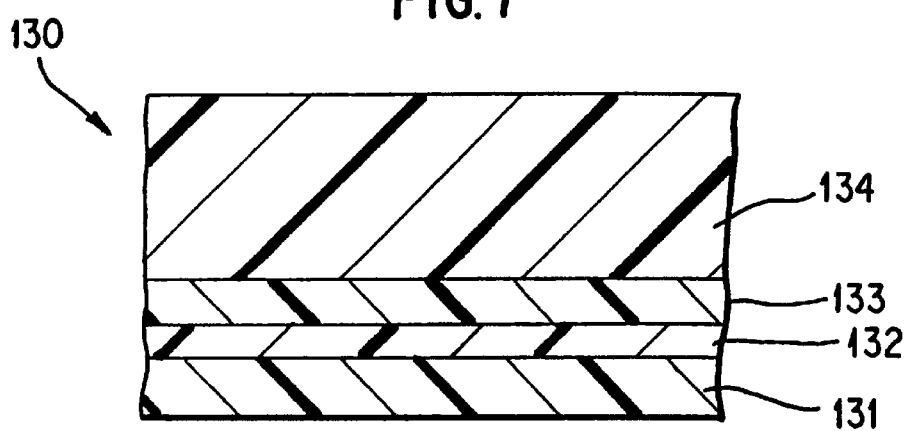
FIG. 8 illustrates a schematic cross-sectional view of a multilayer Film Nos. 14, described below.

FIG. 8 is a schematic cross-sectional view of multilayer film 130, which is representative of the cross-section of comparative Film No. 14, which contains layers 131–134. Comparative Film No. 14 was a four-layer film having a thickness of 2 mils and a total of four layers, and had a physical structure, in terms of layer arrangement, function, chemical composition, and thickness, as set forth in Table VII, below.

TABLE VII

Characteristics of comparative Film No. 14

| FIG. 8 layer designation | layer function | chemical identity | layer thickness (mils) |
|---|---|---|---|
| 134 | outside, grease-resistant, abuse-resistant, & tie | 92.5% EVA #7 7.5% LLDPE #1 | 0.50 |
| 133 | $O_2$-barrier | PVDC Blend #1 | 0.20 |
| 132 | bulk & tie | irradiated EVA #6 | 1.0 |
| 131 | inside & grease-resistance, & sealing | 90% irradiated EVA #5 10% irradiated LLDPE #1 | 0.29 |

EVA #5, in layer 131, was PE3507-2 (TM) ethylene/vinyl acetate copolymer having a vinyl acetate content of 6.2%, a density of 0.93 g/cc, a melt index of 2.5, obtained from DuPont de Nemours, of Wilmington, Del. LLDPE #1, in layers 131 and 134, was DOWLEX 2045 (TM) linear low density polyethylene, having a density of 0.92 g/cc, obtained from The Dow Chemical Co., of Midland, Mich. EVA #6, in layer 132, was ESCORENE LD-720.92 ethylene/vinyl acetate copolymer having a vinyl acetate content of 19%, a density of 0.94 g/cc, and a melt index of 1.5, and was obtained from the Exxon Chemical Company. EVA #7, in layer 134, was LD-318.92 ethylene/vinyl acetate copolymer having a vinyl acetate content of 9%, a melt index of 2.0, and a density of 0.93 g/cc, and was also obtained from the Exxon Chemical Company.

Standard Grease-Resistance Test

The purpose of the following standard grease-resistance test is to determine the ability of different packaging materials to resist grease attack to the outer film layer when run at the recommended shrink tunnel conditions after being contaminated by fats and oils. The procedure is as follows:

1. Using a cotton swab, a small amount of mineral oil (i.e., several milligrams of mineral oil) was applied to the outer surface (about 4 square inches) of a film;
2. The mouth of a small beaker is placed over the mineral oil;
3. Excess film is pulled up over the outside of the beaker, and a rubber band placed to hold the excess film against the sides of the beaker, while the mineral oil is kept toward the inside of the beaker;
4. The film is pulled so that the portion having mineral oil thereon remains taught, to remove the wrinkles from the film in the area over the beaker;
5. With the beaker inverted, the film is allowed to come into contact with 200° F. water for an instant, i.e., less than one second; and
6. The film is then removed from the beaker and evaluated visually for grease attack, according to the following scale: (1) Excellent—no visible evidence of change;
   (2) Very Good—slight cloudiness or haze;
   (3) Good—moderate cloudiness or haze;
   (4) Fair—materials show severe whitening but surface layer does not come off when rubbed lightly with the finger, i.e., no delamination upon rubbing; and
   (5) Poor—very severe whitening of surface with obvious surface breakdown. Surface can be removed by rubbing lightly with the finger, i.e., the surface delaminates upon rubbing.

The visual evaluation of grease attack is then conducted by one or more individuals, using the evaluation categories and descriptions provided above.

Figure 9:
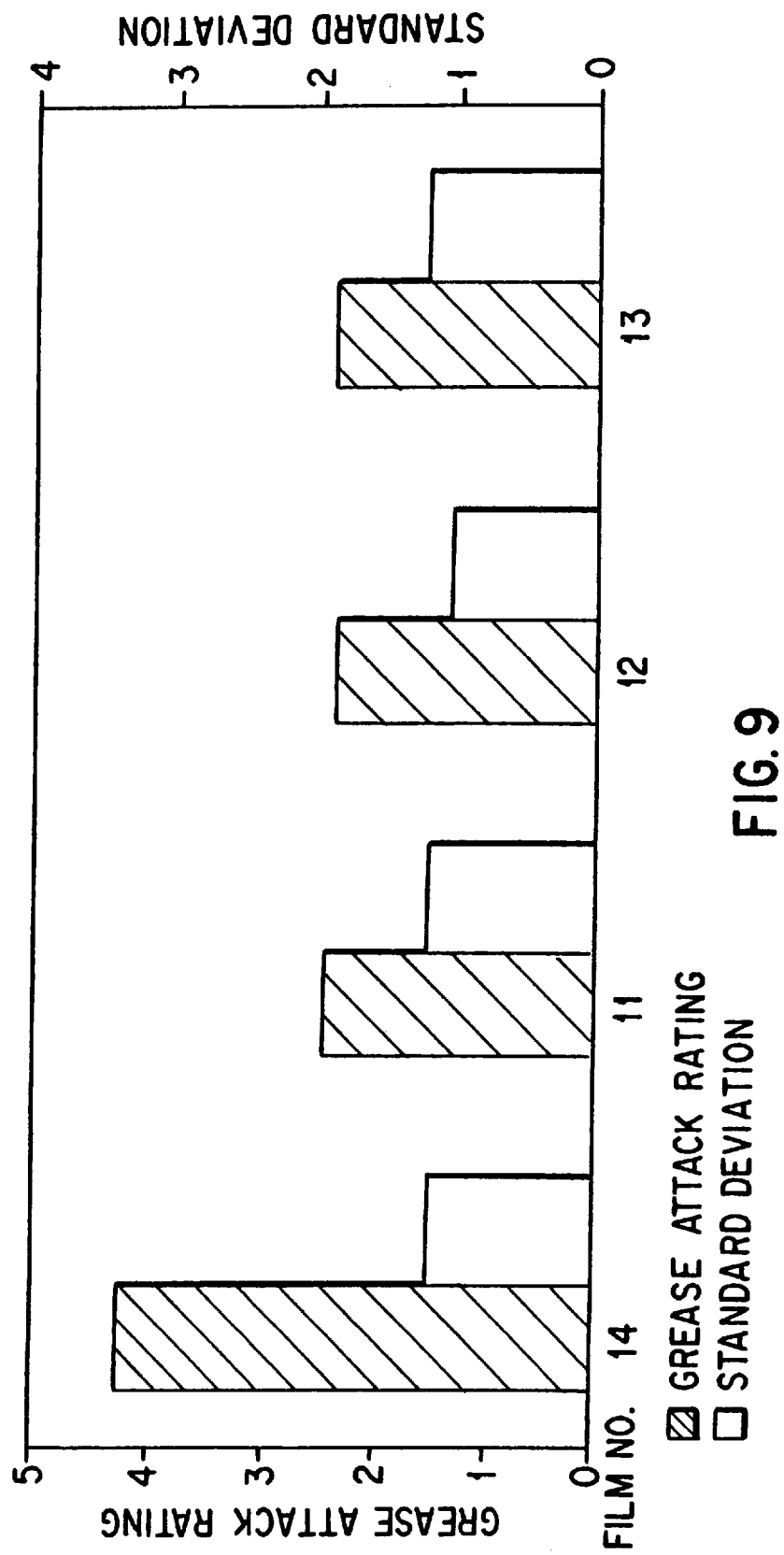
FIG. 9 is a bar graph illustrating grease-resistance results for a comparative prior art film, i.e., comparative Film No. 14, in contrast to the grease-resistance of Film Nos. 11, 12, and 13, each of which is an embodiment of a film according to the present invention.

FIG. 9 provides grease-resistance results for a comparative prior art film, i.e., comparative Film No. 14, in contrast to the grease-resistance of Film Nos. 11, 12, and 13, each of which is an embodiment of a film according to the present invention. The results provided by FIG. 9 illustrate an improvement in grease-resistance of the films over the comparative Film No. 14, a film which has been commercially available and has been used for the packaging of meat products in shrink bags.

The grease-resistant films according to the present invention preferably have at least one outer layer which is grease-resistant; more preferably, both outer layers of the film are grease-resistant. Preferably, the grease-resistant outer layer(s) comprise at least one member selected from the group consisting of: (1) ethylene/alpha-olefin copolymer irradiated to a level of from about 3 to 8 MR; or (2) ethylene/alpha-olefin copolymer in an amount of at from about 50 to 80 weight percent, more preferably 50 to 75 weight percent, based on the weight of the first layer, in combination with a second component in an amount of at least 50 to 20 weight percent, more preferably 50 to 25 weight percent, based on the weight of the first layer, the second component comprising at least one member selected from the group consisting of:
   (a) ethylene/propylene copolymer (e.g., TAFMER XR107L (TM) linear ethylene/propylene copolymer obtained from Mitsui Petrochemical Industries, Ltd., having an office at Houston, Tex., this ethylene/propylene copolymer containing ethylene polymerization units in an amount of at least 10 percent; preferably 10–40; more preferably, about 25 weight percent, based on the weight of the entire copolymer);

(b) propylene/butene copolymer (e.g., CEFOR SRD4-105 (TM) propylene/butene copolymer, obtainable from the Shell Chemical Company, of Houston, Tex., this propylene/butene copolymer containing butene polymerization units in an amount of at least 5 percent; preferably 5–40; more preferably, about 14 weight percent, based on the weight of the entire copolymer);

(c) polybutylene, (e.g., DURAFLEX POLYBUTYLENE DP1560 (TM) polybutylene, also obtained from the Shell Chemical Company);

(d) ionomer;

(e) ethylene/acrylic acid copolymer;

(f) styrene-butadiene-styrene block copolymer;

(g) styrene-isoprene-styrene block copolymer;

(h) styrene-ethylene/butylene-styrene block copolymer;

(i) ethylene/alpha-olefin copolymer (e.g., TAFMER A (TM) linear ethylene/alpha-olefin copolymer, obtained from Mitsui Petrochemical Industries, Ltd., having an office at Houston, Tex.); and (j) polybutene-1 (e.g., BEAULON (TM) polybutene-1, also obtained from Mitusi Petrochemical Industries, Ltd.).

The grease-resistance of a polymer is determined by the inherent chemical characteristics of the polymer with respect to grease. The polarity of the polymer and the solubility of the polymer in grease, are both related to whether the polymer is grease-resistant

Film No. 15

Figure 10:
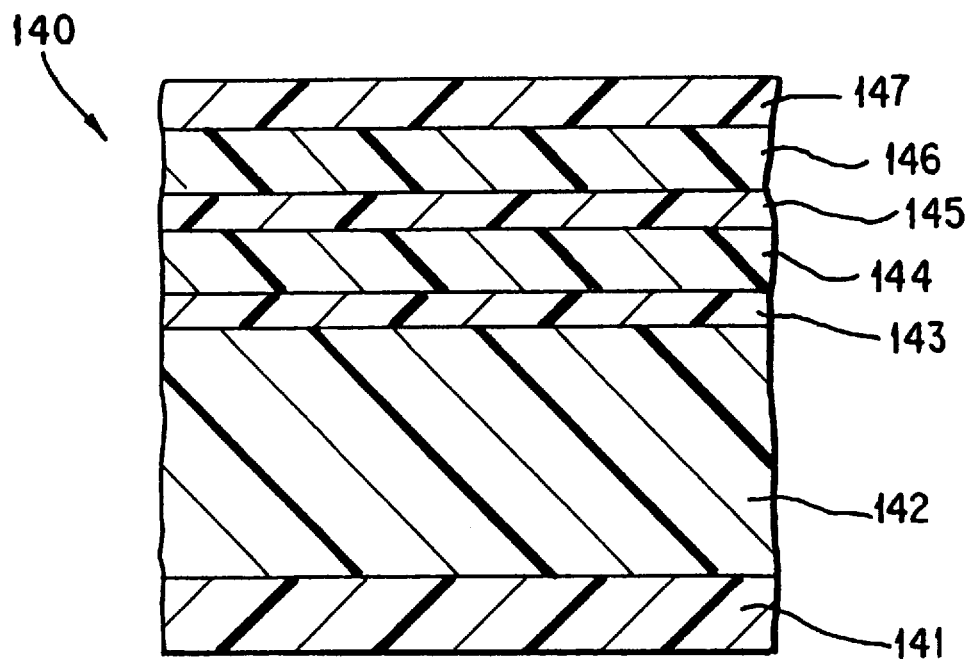
FIG. 10 illustrates a schematic cross-sectional view of multilayer Film No. 15.

Film No. 15 is a seven-layer film according to the present invention, which had a thickness of 1.7 mils and had a relatively high content of homogeneous ethylene/alpha-olefin copolymer, on a weight percent basis. FIG. 10 is a schematic cross-sectional view of multilayer film 140, which is representative of the cross-sections of Film No. 15, containing layers 141–147. Film No. 15 had a physical structure, in terms of layer arrangement, function, chemical composition, and thickness, as set forth in Table VIII, below.

TABLE VIII

Characteristics of Film No. 15

| FIG. 10 layer designation | layer function | chemical identity | layer thickness (mils) |
|---|---|---|---|
| 147 | outside, grease-resistant, & abuse-resistant | homogeneous ethylene/alpha-olefin #1; | 0.12 |
| 146 | bulk and abuse resistant | homogeneous ethylene/alpha-olefin #4 | 0.12 |
| 145 | tie | EMA #1 | 0.08 |
| 144 | O₂-barrier | PVDC Blend #1 | 0.15 |
| 143 | tie | EVA #1 | 0.08 |
| 142 | bulk | homogeneous ethylene/alpha-olefin #4 | 0.89 |
| 141 | inside & grease-resistant | homogeneous ethylene/alpha-olefin #3 | 0.25 |

Film No. 16

Figure 11:
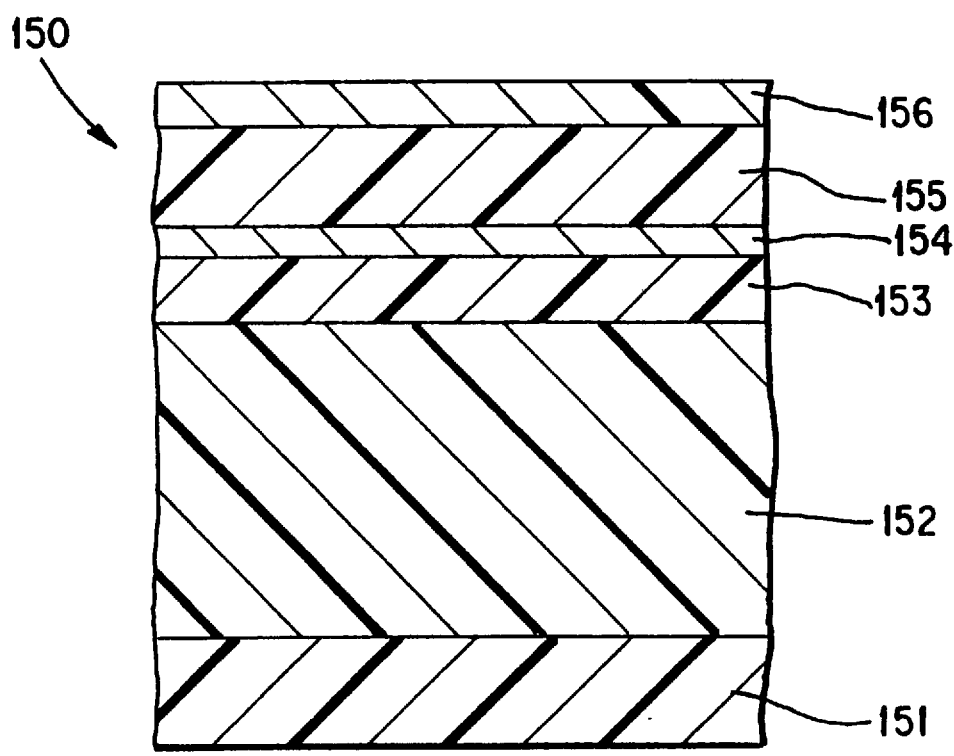
FIG. 11 illustrates a schematic cross-sectional view of multilayer Film No. 16.

Film Nos. 16 is a six-layer film according to the present invention, which also had a thickness of 1.7 mils. FIG. 11 is a schematic cross-sectional view of multilayer film 150, which is representative of the cross-sections of Film No. 16, containing layers 151–156. Film No. 16 had a physical structure, in terms of layer arrangement, function, chemical composition, and thickness, as set forth in Table VI, below.

TABLE IX

Characteristics of Film No. 16

| FIG. 11 layer designation | layer function | chemical identity | layer thickness (mils) |
|---|---|---|---|
| 156 | outside, grease-resistant, & abuse-resistant | homogeneous ethylene/alpha-olefin #1; | 0.10 |
| 155 | bulk and abuse resistant | EVA #1 | 0.31 |
| 154 | tie | EMA #1 | 0.10 |
| 153 | O₂-barrier | PVDC Blend #1 | 0.20 |
| 152 | tie & bulk | EVA #1 | 1.0 |
| 151 | inside & grease-resistant | homogeneous ethylene/alpha-olefin #3 | 0.29 |

Furthermore, it has been discovered that multilayer films which have:

(a) a free shrink of at least 80 percent at 185° F., and (b) bulk core layer(s) comprising homogeneous ethylene/alpha-olefin copolymer, exhibit a surprisingly high level of impact strength per unit of film thickness. Table X, below, provides data illustrating the high impact strength of such films, exemplified by Film Nos. 4, 5, 6, 7, and 15, described in detail above. Furthermore, impact strength data for comparative Film No. 14 is provided as a reference point indicating the relative strength of a film which does not have both (a) and (b) above.

TABLE X

Films Having High Free-Shrink at 185° F., and High Impact Strength Per Unit Thickness

| Film No. | Peak Load (lbs) | Energy to Break (ft-lbs) | Free Shrink at 185° F. (percent) | thickness (mils) |
|---|---|---|---|---|
| 4 | 68 | 3.7 | 100–107 | 2.0 |
| 5 | 58 | 3.0 | 100–107 | 1.75 |
| 6 | 41 | 1.7 | 100–107 | 1.50 |
| 7 | 38 | 1.6 | 100–107 | 1.25 |
| 14 (comparative) | 30 | 1.0 | 75 | 2.0 |
| 15 | 62 | 4.2 | 100–107 | 1.7 |
| 15* | 64 | 4.7 | 100–107 | 2.0 |

Film No. "15*" was identical to Film No. 15 with respect to the number of layers, composition of layers, and relative thickness of layers. However, Film No. 15* had a total thickness of only 1.7 mils, whereas Film No. 15, as described in detail above, had a total thickness of 2.0 mils.

As is evident from the data present in Table X, the peak load strength per unit thickness of Film Nos. 4, 5, 6, 7, 15, and 15* is 34 lbs/mil, 33.1 lbs/mil, 27.3 lbs/mil, 30.4 lbs/mil, 36.5 lbs/mil, and 32 lbs/mil respectively, whereas the peak load strength per unit thickness of comparative Film No. 14 is only 15 lbs/mil. Thus, Table X illustrates that high-free-shrink at 185° F., homogeneous-polymer-core multilayer films have a strength per unit thickness about twice that of multilayer films having relatively low-free-shrink at 185° with an EVA-based core bulk layer.

Preferably, this "high-shrink, high-strength" film has a peak load strength per unit thickness of from about 20 to 50 lbs/mil; more preferably, a peak load strength of from about 25 to 45 lbs/mil; still more preferably, a peak load strength of from about 27.3 to 36.5 lbs/mil. The film can have a peak load strength per unit thickness of from about 20 to less than 27 lbs/mil, or from about 37 to 50 lbs/mil. Preferably, the high-shrink, high-strength film is also a preferred film according to the first aspect of the present invention as set forth above. Preferably, the film is used in a preferred bag according to the second aspect of the present invention, described above. Preferably, the bag is used in a preferred packaged product according to the second aspect of the present invention, also described above.

Figure 12:
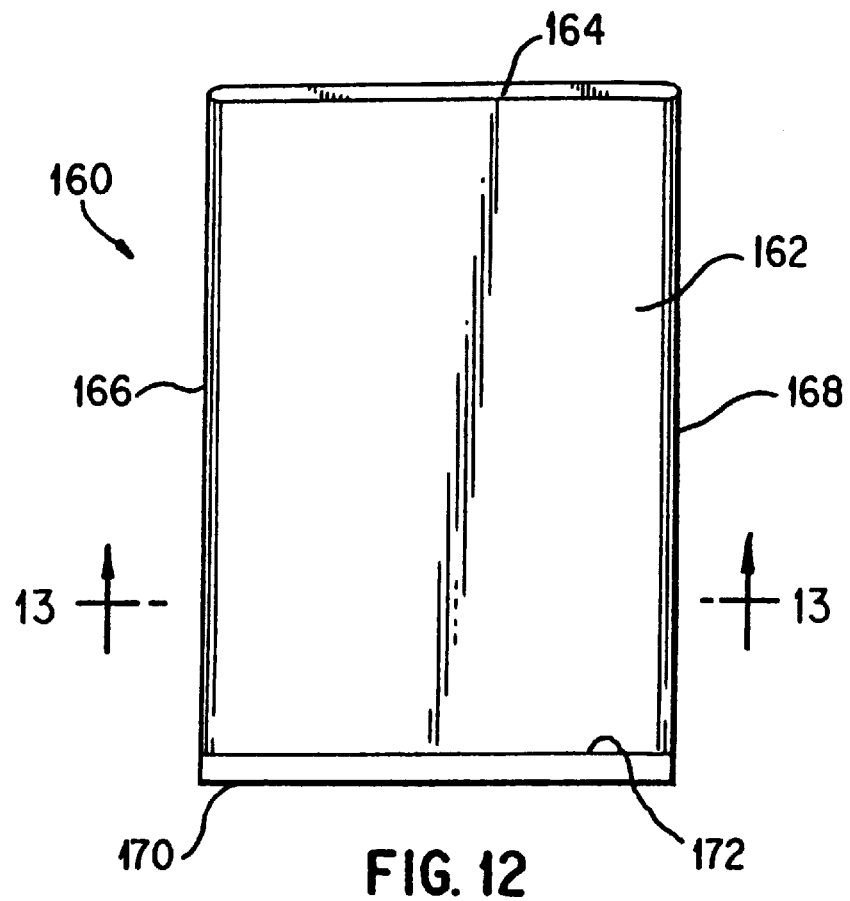
FIG. 12 illustrates a schematic of an end-seal bag in accordance with the present invention, in lay-flat view.
Figure 13:
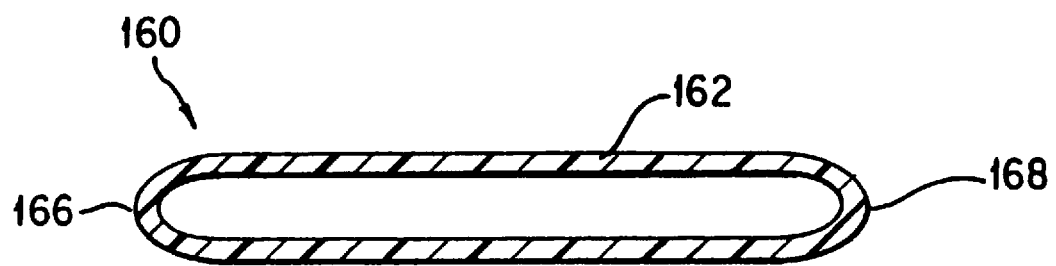
FIG. 13 illustrates a cross-sectional view of the end-seal bag illustrated in FIG. 12, taken through section 13—13 of FIG. 12.

FIG. 12 is a schematic of a preferred end seal bag 160, in a lay-flat position, this bag being in accord with the present invention; FIG. 13 is a cross-sectional view of bag 160 taken through section 13—13 of FIG. 12. Viewing FIGS. 12 and 13 together, bag 160 comprises bag film 162, top edge 164 defining an open top, first bag side edge 166, second bag side edge 168, bottom edge 170, and end seal 172.

Figure 14:
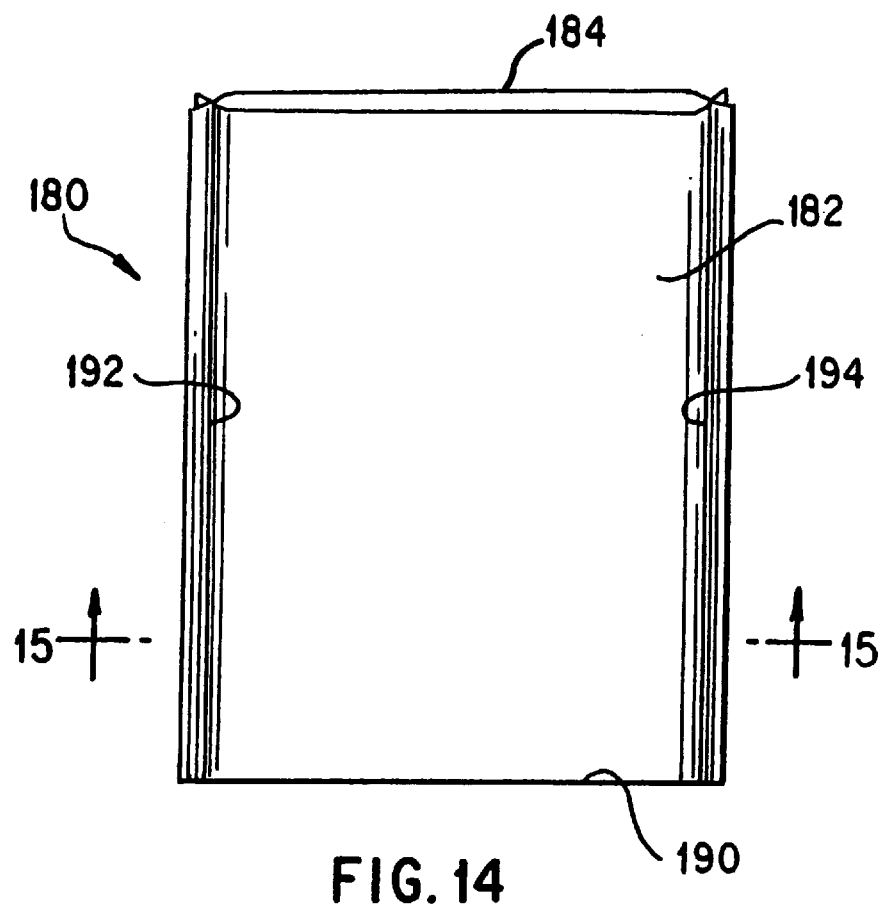
FIG. 14 illustrates a schematic of a side-seal bag in accordance with the present invention, in lay-flat view.
Figure 15:
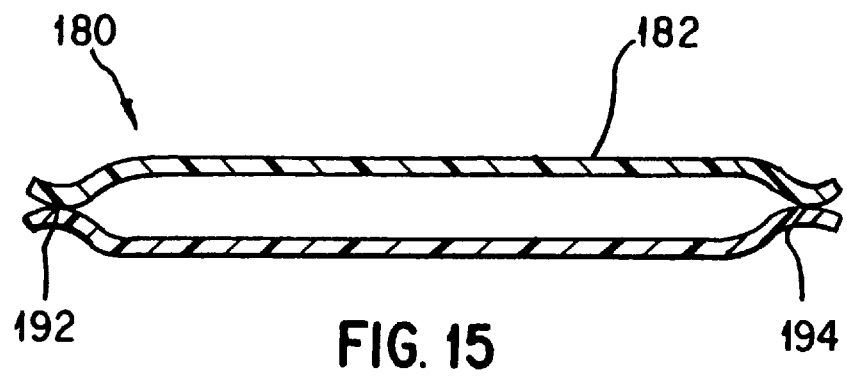
FIG. 15 illustrates a cross-sectional view of the side-seal bag illustrated in FIG. 14, taken through section 15—15 of FIG. 14.

FIGS. 14 and 15 illustrate bag 180, an alternative bag according to the present invention. Bag 180 is a "side seal" bag. FIG. 14 illustrates a schematic of side seal bag 180, in a lay-flat view; FIG. 15 illustrates a cross-sectional view taken through section 15—15 of FIG. 14. With reference to FIGS. 14 and 15 together, side seal bag 180 is comprised of bag film 182, top edge 184 defining an open top, bottom edge 190, first side seal 192, and second side seal 194.

Figure 16:
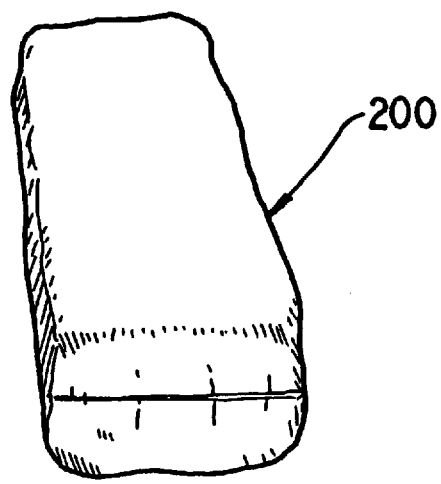
FIG. 16 illustrates a perspective view of a packaged product according to the present invention.

FIG. 16 illustrates packaged meat product 200 according to the present invention. Packaged meat product 200 comprises a sealed package within which is a meat product, such as a boneless ham product. The sealed package is preferably formed using a bag according to the present invention, with the product being packaged in the bag, followed by evacuation, sealing, and shrinking of the bag, to result in packaged meat product 200.

Although the bag according to the present invention can be used in the packaging of any product, the bag of the present invention is especially advantageous for the packaging of food products, especially processed meat products and fresh meat products. Among the types of meat which can be packaged in the films and packages according to the present invention are poultry, pork, beef, lamb, goat, horse, and fish. Preferably, the bag of the present invention is used in the packaging of boneless meat products, such as boneless beef, pork, poultry, lamb, and fish products.

The polymer components used to fabricate multilayer films according to the present invention may also contain appropriate amounts of other additives normally included in such compositions. These include slip agents such as talc, antioxidants, fillers, dyes, pigments and dyes, radiation stabilizers, antistatic agents, elastomers, and the like additives known to those of skill in the art of packaging films.

Although the present invention has been described in connection with the preferred embodiments, it is to be understood that modifications and variations may be utilized without departing from the principles and scope of the invention, as those skilled in the art will readily understand. Accordingly, such modifications may be practiced within the scope of the following claims.

What is claimed is:

1. A heat-shrinkable, biaxially-oriented, multilayer film comprising a first layer comprising an ethylene/alpha-olefin copolymer having a major DSC peak of less than 105° C., wherein the multilayer film has a total free shrink, at 185° F., of from about 80 to 180 percent, and all layers of the multilayer film are shrink-compatible with respect to one another, and the film has peak load strength per unit thickness of from about 20 to 50 pounds per mil.

2. The multilayer film according to claim 1, further comprising a second layer, the second layer being a core $O_2$-barrier layer.

3. The multilayer film according to claim 2, wherein:
the first layer comprises ethylene/alpha-olefin copolymer in an amount of from about 50 to 100 weight percent, based on the weight of the first layer;
the ethylene/alpha-olefin copolymer comprises homogeneous ethylene/alpha-olefin copolymer in an amount of from about 50 to 100 weight percent, based on the weight of ethylene/alpha-olefin copolymer, the homogeneous ethylene/alpha-olefin copolymer having a major DSC peak of less than 105° C.

4. The multilayer film according to claim 3, wherein the free shrink, at 185° F., is from about 80 to 160 percent, and the film has peak load strength per unit thickness of from about 25 to 45 pounds per mil.

5. The multilayer film according to claim 4, wherein the free shrink, at 185° F., is from about 85 to 130 percent, and the film has peak load strength per unit thickness of from about 27.3 to 36.5 pounds per mil.

6. The multilayer film according to claim 5, wherein the free shrink, at 185° F., is from about 90 to 120 percent.

7. The multilayer film according to claim 6, wherein the free shrink, at 185° F., is from about 100 to 110 percent.

8. The multilayer film according to claim 4, wherein the first layer is an outer layer, and the multilayer film further comprises a third layer, the third layer being an outer layer, the third layer comprising at least one member selected from the group consisting of ionomer, homogeneous ethylene/alpha-olefin copolymer, ethylene/acrylic acid copolymer, ethylene/methyl acrylic acid copolymer, ethylene/vinyl acetate copolymer, and propylene/ethylene copolymer having an ethylene content of at least 10 percent.

9. The multilayer film according to claim 8, wherein at least one film layer comprises a crosslinked polymer.

10. The multilayer film according to claim 8, further comprising:
a fourth layer, the fourth layer being a tie layer, the fourth layer being between the first layer and the second layer, the fourth layer comprising at least one member selected from the group consisting of ethylene/vinyl acetate copolymer, ethylene/methacrylic acid copolymer, ethylene/ethyl acrylate copolymer, low density polyethylene, and linear low density polyethylene;
a fifth layer, the fifth layer being a tie layer, the fifth layer being between the second layer and the third layer, the fifth layer comprising at least one member selected from the group consisting of ethylene/vinyl acetate copolymer, ethylene/methacrylic acid copolymer, ethylene/ethyl acrylate copolymer, low density polyethylene, and linear low density polyethylene.

11. The multilayer film according to claim 3, wherein a restrained-shrink portion of the film has a haze of from about 0 to 40 percent, after restrained heat-shrinking according to a standard shrink-compatibility test.

12. The multilayer film according to claim 11, comprising an outer grease-resistant layer.

13. The multilayer film according to claim 12, wherein the outer grease-resistant layer comprise crosslinked, homogeneous ethylene/alpha-olefin copolymer.

14. The multilayer film according to claim 13, wherein the outer grease-resistant layer comprises:
- (A) a first component comprising homogeneous ethylene/alpha-olefin copolymer in an amount of at least 50 weight percent, based on the weight of the first layer; and
- (B) a second component in an amount of at least 20 weight percent, based on the weight of the first layer, the second component comprising at least one member selected from the group consisting of:
  - (I) ethylene/propylene copolymer;
  - (ii) propylene/butene copolymer;
  - (iii) polybutylene;
  - (iv) ionomer;
  - (v) ethylene/acrylic acid copolymer;
  - (vi) styrene-butadiene-styrene block copolymer;
  - (vii) styrene-isoprene-styrene block copolymer;
  - (viii) styrene-ethylene/ butylene-styrene block copolymer;
  - (ix) ethylene/alpha-olefin copolymer; and
  - (x) polybutene-1.

15. The multilayer film according to claim 12, wherein a first outer grease-resistant layer comprises crosslinked shrink-compatible homogeneous ethylene/alpha-olefin copolymer, and a second grease-resistant outer layer comprises:
- (A) a first component comprising homogeneous ethylene/alpha-olefin copolymer in an amount of at least 50 weight percent, based on the weight of the first layer; and
- (B) a second component in an amount of at least 20 weight percent, based on the weight of the first layer, the second component comprising at least one member selected from the group consisting of:
  - (i) ethylene/propylene copolymer;
  - (ii) propylene/butene copolymer;
  - (iii) polybutylene;
  - (iv) ionomer;
  - (v) ethylene/acrylic acid copolymer;
  - (vi) styrene-butadiene-styrene block copolymer;
  - (vii) styrene-isoprene-styrene block copolymer;
  - (viii) styrene-ethylene/butylene-styrene block copolymer;
  - (ix) ethylene/alpha-olefin copolymer; and
  - (x) polybutene-1.

16. The multilayer film according to claim 15, wherein: the first component is present, in the outer grease-resistant layer, in an amount of from about 50 to 80 weight percent, based on the weight of the grease-resistant layer; and
the second component is present, in the outer grease-resistant layer, in an amount of from about 20 to 50 weight percent, based on the weight of the grease-resistant layer.

17. The multilayer film according to claim 15, wherein: the first component comprises homogeneous ethylene/alpha-olefin in an amount of from about 50 to 75 weight percent, based on the weight of the first component;
the second component comprises ethylene/propylene copolymer in an amount of from about 25 to 50 weight percent, based on the weight of the grease-resistant layer.

18. A bag comprising a heat-shrinkable, biaxially-oriented, multilayer film comprising a first layer comprising an ethylene/alpha-olefin copolymer having a major DSC peak less than 105° C., wherein the multilayer film has a total free shrink, at 185° F., of from about 80 to 180 percent, and all layers of the multilayer film are shrink-compatible with respect to one another, and the film has peak load strength per unit thickness of from about 20 to 50 pounds per mil.

19. The bag according to claim 18, wherein
the multilayer film comprises a second layer, the second layer being a core $O_2$-barrier layer, the second layer comprising polyvinylidene chloride; and
and the film has a free shrink at 185° F., of from about 80 to 160 percent, and peak load strength per unit thickness of from about 25 to 45 pounds per mil.

20. The bag according to claim 19, wherein:
the first layer comprises ethylene/alpha-olefin copolymer in an amount of from about 50 to 100 weight percent, based on the weight of the first layer; and
the ethylene/alpha-olefin copolymer comprises homogeneous ethylene/alpha-olefin copolymer in an amount of from about 50 to 100 weight percent, based on the weight of ethylene/alpha-olefin copolymer, the homogeneous ethylene/alpha-olefin copolymer having a major DSC peak of less than 105° C.

21. The bag according to claim 20, wherein the free shrink, at 185° F., is from about 85 to 130 percent, and the film has peak load strength per unit thickness of from about 27.3 to 36.5 pounds per mil.

22. The bag according to claim 21, wherein the multilayer film comprises an outside grease-resistant layer.

23. A packaged product comprising a package comprising:
a sealed bag comprising a heat-shrinkable, biaxially-oriented, multilayer film comprising a first layer comprising an ethylene/alpha-olefin copolymer having a major DSC peak less than 105° C., wherein the multilayer film has a total free shrink, at 185° F., of from about 80 to 180 percent, and all layers of the multilayer film are shrink-compatible with respect to one another, and the film has peak load strength per unit thickness of from about 20 to 50 pounds per mil, and
a product in said package, the product comprising at least one member selected from the group consisting of meat and cheese.

24. The packaged product according to claim 23, wherein:
the multilayer film comprises a second layer, the second layer being a core $O_2$-barrier layer, the second layer comprising polyvinylidene chloride; and
the multilayer film has a free shrink, at 185° F., of from about 80 to 160 percent, and all layers of the multilayer film are shrink-compatible with respect to one another, and the film has peak load strength per unit thickness of from about 25 to 45 pounds per mil.

25. The packaged product according to claim 24, wherein:
the ethylene/alpha-olefin copolymer comprises homogeneous ethylene/alpha-olefin copolymer in an amount of from about 50 to 100 weight percent, based on the weight of ethylene/alpha-olefin copolymer, the homogeneous ethylene/alpha-olefin copolymer having a major DSC peak of less than 105° C.;
the ethylene/alpha-olefin copolymer is present in an amount of from about 50 to 100 weight percent, based on the weight of the first layer.

26. The packaged product according to claim 25, wherein the film has a free shrink, at 185° F., of from about 85 to 130 percent, and the film has peak load strength per unit thickness of from about 27.3 to 36.5 pounds per mil.

27. The packaged product according to claim 26, wherein the multilayer film comprises an outside grease-resistant layer.

28. The packaged product according to claim 26, wherein the product is a fresh meat product.

29. The heat-shrinkable, biaxially-oriented, multilayer film according to claim 1, wherein the film has from 4 to 20 layers.

30. The heat-shrinkable, biaxially-oriented, multilayer film according to claim 1, wherein the film has from 4 to 12 layers.

31. The bag according to claim 18, wherein the multilayer film has from 4 to 20 layers.

32. The bag according to claim 18, wherein the multilayer film has from 4 to 12 layers.

33. The packaged product according to claim 23, wherein the multilayer film has from 4 to 20 layers.

34. The packaged product according to claim 23, wherein the multilayer film has from 4 to 12 layers.

* * * * *